United States Patent
Ishida et al.

(10) Patent No.: US 9,016,729 B2
(45) Date of Patent: Apr. 28, 2015

(54) QUICK CONNECTOR AND CHECKER

(75) Inventors: Yoshimitsu Ishida, Komaki (JP); Yasuki Takenaka, Fujisawa (JP)

(73) Assignees: Sumitomo Riko Company Limited, Aichi-Ken (JP); A. Ryamond et CIE-SCS, Grenoble (FR)

( * ) Notice: Subject to any disclaimer, the term of this patent is extended or adjusted under 35 U.S.C. 154(b) by 1816 days.

(21) Appl. No.: 12/096,060

(22) PCT Filed: Dec. 5, 2006

(86) PCT No.: PCT/JP2006/324296
§ 371 (c)(1),
(2), (4) Date: Nov. 19, 2009

(87) PCT Pub. No.: WO2007/066675
PCT Pub. Date: Jun. 14, 2007

(65) Prior Publication Data
US 2010/0052313 A1    Mar. 4, 2010

(30) Foreign Application Priority Data
Dec. 6, 2005 (JP) ................ 2005-352652

(51) Int. Cl.
*F16L 37/088* (2006.01)

(52) U.S. Cl.
CPC .......... *F16L 37/088* (2013.01); *F16L 2201/10* (2013.01)

(58) Field of Classification Search
USPC ................ 285/93, 308, 321, 921, 305, 319
See application file for complete search history.

(56) References Cited

U.S. PATENT DOCUMENTS

| 4,948,175 | A  | * | 8/1990  | Bartholomew | 285/39 |
| 6,328,344 | B1 | * | 12/2001 | Tozaki et al. | 285/93 |
| 6,722,703 | B2 | * | 4/2004  | Takayanagi | 285/93 |
| 7,044,505 | B2 | * | 5/2006  | Takayanagi | 285/93 |

(Continued)

FOREIGN PATENT DOCUMENTS

| DE | 19822574     | 10/1999 |
| DE | 102004062887 | 10/2005 |

(Continued)

OTHER PUBLICATIONS

English Abstract of JP-U1-1-156389, published Oct. 27, 1989, Usui Kokusai Sangyo Kaisha, Ltd.

(Continued)

*Primary Examiner* — Aaron Dunwoody
*Assistant Examiner* — Fannie Kee
(74) *Attorney, Agent, or Firm* — Andrus Intellectual Property Law, LLP

(57) ABSTRACT

In a quick connection device for piping installed with a checker (40), a connector housing (20) of a quick connector (10) is formed with opening portions (74) for inserting resilient legs (58) therein through the opening portions (74) in a direction perpendicular to an axis from leading ends of the resilient legs, and inserted portions of the resilient legs (58) are held inside the connector housing (20). The resilient legs (58) are resiliently deformed in an axially inward direction by an annular projecting portion on an outer peripheral surface of a mating pipe at insertion of the mating pipe, to unlatch latching pawls (64) of the resilient legs (58) from corresponding latch portions of the connector housing (20), whereby the checker (40) is allowed to be removed out of the connector housing (20).

10 Claims, 26 Drawing Sheets

(56) References Cited

U.S. PATENT DOCUMENTS

| | | | |
|---|---|---|---|
| 7,401,818 B2* | 7/2008 | Takayanagi | 285/319 |
| 7,464,970 B2* | 12/2008 | Yamada et al. | 285/305 |
| 2003/0160448 A1* | 8/2003 | Takayanagi | 285/305 |
| 2003/0218334 A1* | 11/2003 | Takayanagi | 285/319 |
| 2003/0218335 A1 | 11/2003 | Takayanagi | |
| 2005/0087981 A1* | 4/2005 | Yamada et al. | 285/81 |
| 2005/0136741 A1* | 6/2005 | Yoshida et al. | 439/622 |
| 2005/0179258 A1* | 8/2005 | Brandt et al. | 285/308 |
| 2005/0218650 A1* | 10/2005 | Pepe et al. | 285/308 |
| 2005/0230968 A1* | 10/2005 | Takayanagi et al. | 285/93 |

FOREIGN PATENT DOCUMENTS

| | | |
|---|---|---|
| FR | 2 705 431 | 11/1994 |
| FR | 2 840 050 | 11/2003 |
| JP | 1 156389 | 10/1989 |
| JP | 01-180091 | 12/1989 |
| JP | 07-508090 | 9/1995 |
| JP | 11-201355 | 7/1999 |
| JP | 11-210968 | 8/1999 |
| JP | 11-344182 | 12/1999 |
| JP | 2003-343782 | 12/2003 |
| JP | 2004-251319 | 9/2004 |
| RU | 974024 | 11/1982 |
| WO | 94/27077 | 11/1994 |

OTHER PUBLICATIONS

European Search Report for European Patent Application No. 06 83 4051, dated Jan. 29, 2014.

* cited by examiner (A)

(B)

(A)

(B)

(A)

(B)

(A)

(B)

QUICK CONNECTOR AND CHECKER

TECHNICAL FIELD

The invention relates to a quick connector for allowing quick connection of a piping tube and a mating pipe, and a checker to be installed in the quick connector, specifically, to a quick connector used with a checker installed therein for verifying complete insertion of a mating pipe, and a checker used for such quick connector.

BACKGROUND ART

For a long time, a resin tube has been widely used for piping for transporting a fuel or other piping.

When such resin tube is used for piping, typically the tube is used in combination with a quick connector for allowing a simple and quick connection with a mating pipe.

In this case, it can be unnecessary to swage a metal fitting on an end portion of a rubber tube for connection of the rubber tube with the mating pipe as in the case that the rubber tube (rubber hose) is used for piping.

With regard to an example of this type of a quick connector, one such example is disclosed, for example, in Patent Document 1 below, and construction of such quick connector will be explained with reference to FIG. 24.

In the Figure, reference numeral 200 indicates a resin tube, reference numeral 202 indicates a mating pipe with which the tube 200 is connected.

The mating pipe 202 is formed with an annular projecting portion 204 on an outer peripheral surface thereof.

Reference numeral 206 indicates a quick connector, which has a tubular connector body (here, entirely made of resin) 208 and a retainer 210 also made of resin.

The connector body 208 has a nipple portion (press-fit portion) 218 as a connecting portion to a tube 200 on one axial end thereof, and a connector housing 220 on the other axial end thereof that has a retainer holding portion 219 of a socket shape. Inside the connector housing 220, O-rings 212 as sealing rings are retained together with a middle ring 214 and a bush 216.

The nipple portion 218 is a portion to be press-fitted into the tube 200 in an axial direction, and is formed with annular ribs of saw-edged cross-section with acute angled peaks on a plurality of points of an outer peripheral surface thereof, along an axial direction.

The connector body 208 is connected to the tube 200 by press-fitting the nipple portion 218 into the tube 200.

During that time, these annular ribs formed on the outer peripheral surface of the nipple portion 218 bite in an inner surface of an end portion of the tube 200 that is swollen and deformed by press-fitting to lock the tube 200.

On an outer peripheral surface of the nipple portion 218, an O-ring 212 as a sealing ring is retained, and an air tight seal is provided between the nipple portion 218 and the tube 200 by the O-ring 212.

The above retainer holding portion 219 in a form of a socket shape, is a portion for receiving and holding the retainer 210 inside. The connector body 208 is connected to the mating pipe 202 via the retainer 210 held therein.

The retainer holding portion 219 has window portions 222 apertured through a tubular wall thereof from outside to inside, and arcuate fixing portions 224 that define the other axial end portions of the window portions 222 as shown in FIG. 25 for fixing the retainer 210.

The retainer 210 is a C-shaped annular member or a member of C-shaped cross-section as a whole, and is resiliently expandable in a radial direction due to its resilient deformation.

The retainer 210 has fixing recesses 226 to fit to the fixing portions 224 of the retainer holding portion 219 from radially inside in axially fixed relation, engaging pawls 228 for locking the mating pipe 202 by engaging with the annular projecting portion 204 of the mating pipe 202, and arcuate fitting recesses 230 continuously to the engaging pawls 228 for fitting the annular projecting portion 204 therein from radially inside.

The retainer 210 also has generally tapered inner peripheral cam surfaces 232 and outer peripheral cam surfaces 234, and tabs 236 for resiliently diametrically contracting and deforming the entire retainer 210 in a radially inward direction.

In the quick connector 206, the retainer 210 is axially inserted and held in the retainer holding portion 219, and in this state, when the mating pipe 202 is inserted in the connector housing 220 through an opening of an axial end thereof, the retainer 210, specifically the engaging claws 228 resiliently spread apart in the radial direction due to abutment with the annular projecting portion 204 of the mating pipe 202 and allow passage of the annular projecting portion 204 therethrough.

And, as soon as the annular projecting portion 204 reaches positions of the fitting recesses 230, here the retainer 210 contracts in a radially inward direction due to its stored resilient force to engage the engaging claws 228 with the annular projecting portion 204 and hold the mating pipe 202 at an inserted position in locked state.

Meanwhile, as the case may be, while the retainer 210 is initially attached on the mating pipe 202, the mating pipe 202 with the retainer 210 thereon may be inserted in the retainer holding portion 219 to fix and hold the retainer 210 in the retainer holding portion 219.

With use of the quick connector 206 in this manner, the tube 200 may be connected to the mating pipe 202 easily and quickly.

By the way, in case of connection with use of the quick connector 206, when the mating pipe 202 is incompletely inserted in the quick connector 206, namely the mating pipe 202 is incompletely connected to the quick connector 206, there is a fear that an inside fluid leaks out, and for that reason, a checker for verifying complete insertion of the mating pipe 202 is installed and added on the quick connector 206 and correct connection of the mating pipe 202 and the quick connector 206 is verified by removing the checker from the quick connector 206.

FIGS. 25 and 26 show one example of a quick connection device where the checker is installed on the quick connector 206.

In these Figures, reference numeral 238 indicates a checker made of resin, which has a pair of resilient legs 240, a base portion 242 by which these resilient legs 240 are connected to each other at root ends thereof, and a ring-shaped handle 244 provided on the base portion 242.

The pair of the resilient legs 240 are provided integrally with a pair of inwardly directed latching pawls 246 on respective leading end portions thereof, projecting toward an axis of the connector housing 220.

The checker 238 is resiliently held on the connector housing 220 in such manner that the latching pawls 246 on respective leading end portions of the pair of the resilient legs 240 are introduced to the window portions 222 of the connector housing 220 from outside by resiliently deforming the pair of the resilient legs 240 radially outwardly, and then the respective latching pawls 246 are latched with edge portions (latch portions) 250 of the window portions 222 of the connector housing 220 as shown in FIG. 26 (B), specifically constricted portions 248 of roots of the respective latching pawls 246 are latched onto edge portions 250.

At that time, the pair of resilient legs 240 embrace an outer peripheral surface of the large diameter retainer holding portion 219 of the connector housing 220 inwardly, and are exposed on the outer peripheral surface of the retainer holding portion 219 of the connector housing 220 so as to project therefrom, respectively.

The above base portion 242 of a shape longer in an axial direction is provided with a pair of catching portions 252, 254 on each end portion thereof for catching the large diameter retainer holding portion 219 between axially front and rear sides thereof.

And, one catching portion 254 has a lug 256 for latching to an inner edge portion of an opening on an axial end of the retainer holding portion 219.

The base portion 242 and the pair of the catching portions 252, 254 serve to restrain the checker 238 with respect to the connector housing 220. The catching portions 252, 254 catch the retainer holding portion 219 between the axially front and rear sides thereof in such manner that the base portion 242 closely contacts with a flat surface 260 of the connector housing 220. Thereby a posture of the checker 238 installed on the connector housing is stabilized.

When the checker 238 installed in the connector housing 220 is tilted and moved in the axial direction, the latching pawls 246 tend to be unlatched from the window portions 222, therefore, the base portion 242 and the pair of the catching portions 252, 254 restrain the checker 238 installed on the connector housing 220 to stabilize the posture of the checker 238 installed thereon.

The above mentioned pair of the latching pawls 246 includes slant cam surface 258 on sides thereof facing the annular projecting portion 204 of the mating pipe 202, as shown in FIGS. 25 and 26 (A).

The slant cam surfaces 258 serve as releasing portions to unlatch the latching pawls 246, specifically the constricted portions 248 at roots thereof from the edge portions 250 of the window portions 222 and allow the resilient legs 240 to be removed out of the connector housing 220, due to abutment with the annular projection portion 204 when the mating pipe 202 is completely inserted in the connector housing 220. FIG. 26 (B) shows a state that the constricted portions 248 are unlatched from the edge portions 250 of the window portions 222 as latch portions in this manner.

Here, each of the pair of the latching pawls 246 includes a slant cam surface 262 on an inner side thereof. When the latching pawls 246 are unlatched as stated above, these slant cam surfaces 262 are caught on the edge portions 250.

So, the checker 238 is pulled in a direction perpendicular to an axis by grabbing the handle 244 in this state, the latching pawls 246 are displaced outwardly from the window portions 222 as the resilient legs 240 spread apart diametrically, and the checker 238 is removed entirely out of the connector housing 220.

And, the checker 238 is removed out of the connector housing 220 and collected, thereby insertion of the mating pipe 202 can be verified.

The checker-installed quick connection device as shown in FIGS. 25 and 26 by way of example is disclosed in Patent Document 2 below.

However, the checker-installed quick connection device entails a problem that a space is required around the outer peripheral side of the connector housing 220 for allowing the resilient legs 240 of the checker 238 to be exposed on and projected out of the outer peripheral surface of the connector housing 220, and since the checker 238 is removed from the connector housing 220 by spreading the resilient legs 240 radially outwardly, a space is required around the connector housing 220 additionally for spreading apart the resilient legs.

So, for example, when the tube 200 is arranged in a limited narrow piping space, through components installed in a vehicle body according to a predetermined piping layout, in some case, the resilient legs 240 of the checker 238 projecting out of an outer peripheral side of the connector housing 220 become impediments, and make piping work difficult. Or there is also a problem of creating a fear that peripheral components or articles hit the resilient legs 240 during piping work in the limited space and thereby the checker 238 is removed from the connector housing 220 although the mating pipe 202 is not completely inserted in the connector housing 220.

Patent Document 1: JP-A 11-201355
Patent Document 2: JP-A 11-344182

DISCLOSURE OF INVENTION

Problem to be Solved by Invention

Under the circumstances described above, it is an object of the present invention to provide a quick connector and a checker to be used for the quick connection device installed with a checker that can eliminate the need for securing a large space around the connector housing to install or remove the checker, and that can eliminate a fear that peripheral components or articles hit the resilient legs of the checker during a piping work and thereby the checker is removed out of the connector housing although a mating pipe is incompletely inserted in the connector housing.

Means for Solving Problem

According to the present invention, there is provided a novel quick connection device. The quick connection device comprises a quick connector that is installed with a checker for verifying complete insertion of a mating pipe in the quick connector. In the quick connection device, (A) the quick connector comprises (a) a tubular connector body having a connecting portion to a piping tube on one axial end of the connector body and a connector housing including a retainer holding portion on the other axial end thereof, and (b) a retainer having an engaging claw that is capable of resiliently spreading in a radial direction for locking the mating pipe, and being held in the retainer holding portion in axially fixed relation for holding the mating pipe at an insert position in locking relation by contracting the engaging claw into engagement with an annular projecting portion on an outer peripheral surface of the mating pipe that is inserted in the connector housing, (B) the checker has (I) a pair of resilient legs, (II) latching pawls provided on leading end portions of the resilient legs and (III) a releasing portion. The latching pawls are formed so as to be in latched relation onto latch portions of the connector housing when the mating pipe is incompletely inserted in the connector housing or so as to be kept in latched relation onto the latch portions of the connector housing while the mating pipe is incompletely inserted in the connector housing. The releasing portion unlatches the latching pawls from the latch portions and allow the resilient legs to be removed from the connector housing due to abutment with the annular projecting portion when the mating pipe is completely inserted in the connector housing. The connector housing has resilient leg insertion opening portions apertured through a tubular wall of the connector housing from outside to inside for inserting the resilient legs into the connector housing from leading ends thereof in a direction perpendicular to an axis and holding inserted portions of the resilient legs within the connector housing. The latch portions are formed inside the connector housing so as to allow the latching pawls to be latched thereonto when the resilient legs are inserted in the connector housing. The releasing portion resiliently deforms the resilient legs in an axially inward direction due to abutment with the annular projecting portion when the mating pipe is inserted in the connector housing and thereby unlatches the latching pawls from the latch portions to allow removal of the resilient legs from the connector housing. And a resilient deformation clearance is defined inside the connector housing for allowing the resilient legs to be resiliently deformed in an axial direction between a position of the resilient legs with the latching pawls being latched onto the latch portions and a position of the resilient legs with the latching pawls being unlatched from the latch portions.

And, a quick connection device according to the present invention may comprise the following quick connector and the following checker installed in the quick connector. The quick connector comprises a tubular connector body having a connecting portion to a piping tube on one axial end of the connector body and a connector housing including a retainer holding portion on the other axial end thereof, and a retainer held in the retainer holding portion. The retainer has an engaging claw. The engaging claw is pushed by an annular projecting portion that is formed on an outer peripheral surface of a mating pipe inserted in the connector housing, and is resiliently moved radially outwardly so as to allow passage of the annular projecting portion. The engaging claw snap-engages with the annular projecting portion to lock the mating pipe when the annular projecting portion of the mating pipe passes the engaging claw. The checker has a pair of resilient legs and latching pawls provided on leading end portions of the pair of the resilient legs, respectively. The checker is installed in the connector housing in a manner such that the latching pawls are latched onto latch portions formed in the connector housing not to be removed in a removing direction of the resilient legs. When the mating pipe is inserted in the connector housing and the annular projecting portion is engaged with the engaging claw of the retainer, the latching pawls are unlatched from the latch portions by being pushed by the annular projecting portion and thereby the checker becomes removable from the connector housing. The connector housing has resilient leg insertion opening portions for inserting the resilient legs into the connector housing from leading ends thereof. The latching pawls of the resilient legs are latched onto the latch portions formed inside the connector housing when the resilient legs are inserted in the connector housing through the opening portions. When the annular projecting portion is engaged with the engaging claw of the retainer, the latching pawls latched onto the latch portions are moved by being pushed by the annular projecting portion in one axial direction until unlatched from the latch portions, and the resilient legs are displaced or deformed so as to be allowed for withdrawal out of the opening portions.

The quick connector is capable of being installed with a checker. (A) The quick connector comprises (a) a tubular connector body having a connecting portion to a piping tube on one axial end of the connector body and a connector housing including a retainer holding portion on the other axial end thereof, and (b) a retainer having an engaging claw capable of resiliently spreading in a radial direction for locking a mating pipe and being held in the retainer holding portion in axially fixed relation for holding the mating pipe at an insert position in locking relation by contracting the engaging claw into engagement with an annular projecting portion on an outer peripheral surface of the mating pipe inserted in the connector housing. The checker is adapted for verifying complete insertion of the mating pipe in the connector housing. (B) The checker has (I) a pair of resilient legs, (II) latching pawls provided on leading end portions of the resilient legs and being in latched relation onto latch portions of the connector housing when the mating pipe is incompletely inserted in the connector housing, and (III) a releasing portion for unlatching the latching pawls from the latch portions and allowing the resilient legs to be removed from the connector housing due to abutment with the annular projecting portion when the mating pipe is completely inserted in the connector housing. The connector housing has resilient leg insertion opening portions apertured through a tubular wall of the connector housing from outside to inside for inserting the resilient legs into the connector housing from leading ends thereof in a direction perpendicular to an axis and holding inserted portions of the resilient legs within the connector housing, the latch portions are formed inside the connector housing so as to allow the latching pawls to be latched thereonto when the resilient legs are inserted in the connector housing, and a resilient deformation clearance is defined inside the connector housing for allowing the resilient legs to be resiliently deformed in an axial direction between a position of the resilient legs with the latching pawls being latched onto the latch portions and a position of the resilient legs with the latching pawls being unlatched from the latch portions. The connector housing as a whole may be provided with a pair of sets of the leg insertion opening portions and a pair of sets of latch portions in opposed relation to each other at two positions of the connector housing circumferentially spaced 180° from each other.

The latch portions inside the connector housing are inwardly directed latch portions. And, the connector housing is provided internally with insertion guides for guiding movement of the latching pawls of the leading end portions of the resilient legs inserted through the opening portions to a latch position with respect to the latch portions in the direction perpendicular to the axis, and also provided internally with withdrawal passage ways continuously from the insertion guides, axially inwardly from the insertion guides and the latch portions, for pulling out the latching pawls unlatched in the direction perpendicular to the axis. And, the withdrawal passage way may be in a form of a recess extending in a direction perpendicular to an axis to the opening portion.

The connector housing has a restraining hole in which a restraining portion projecting from the checker is inserted, and the restraining hole cooperates with the restraining portion to stabilize a posture of the checker installed in the connector housing.

The checker is capable of being installed in a quick connector. (A) The quick connector has (a) a tubular connector body having a connecting portion to a piping tube on one axial end of the connector body and a connector housing including a retainer holding portion on the other axial end thereof, and (b) a retainer having an engaging claw capable of resiliently spreading in a radial direction for locking a mating pipe and being held in the retainer holding portion in axially fixed relation for holding the mating pipe at an insert position in locking relation by contracting the engaging claw into engagement with an annular projecting portion on an outer peripheral surface of the mating pipe inserted in the connector housing. The checker is adapted for verifying complete insertion of a mating pipe in the connector housing. (B) The checker comprises (I) a pair of resilient legs, (II) latching pawls provided on leading end portions of the resilient legs and formed so as to be in latched relation onto latch portions of the connector housing when the mating pipe is incompletely inserted in the quick connector, and (III) a releasing portion for unlatching the latching pawls from the latch portions and allowing the resilient legs to be removed from the connector housing due to abutment with the annular projecting portion of the mating pipe when the mating pipe is completely inserted in the connector housing. The resilient legs are inserted into the connector housing through resilient leg insertion opening portions apertured through a tubular wall of the connector housing from outside to inside. The releasing portion resiliently deforms the resilient legs in an axially inward direction due to abutment with the annular projecting portion when the mating pipe is inserted in the connector housing and thereby unlatches the latching pawls from the latch portions to remove the resilient legs from the connector housing.

The releasing portion is formed on each of the leading end portions of the resilient legs so as to protrude in an axial direction toward the annular projecting portion of the mating pipe.

The checker has a base portion which connects root ends of the pair of the resilient legs each other, and a restraining portion projecting from the base portion in an extending direction of the resilient legs.

And, a quick connector according to the present invention may be configured as follows. The quick connector comprises a tubular connector body having a connecting portion to a piping tube on one axial end of the connector body and a connector housing including a retainer holding portion on the other axial end thereof, and a retainer held in the retainer holding portion. The quick connector is configured to be installed with a checker that has a pair of resilient legs and latching pawls provided on leading end portions of the pair of the resilient legs, respectively. The retainer has an engaging claw that is pushed by an annular projecting portion on an outer peripheral surface of a mating pipe that is inserted in the connector housing, and is resiliently moved radially outwardly so as to allow passage of the annular projecting portion. The engaging claw is formed so as to snap-engage with the annular projecting portion to lock the mating pipe when the annular projecting portion of the mating pipe passes the engaging claw. The quick connector further comprises resilient leg insertion opening portions formed in the connector housing for inserting the resilient legs of the checker into the connector housing from leading ends thereof, and latch portions provided inside the connector housing. The latching pawls of the resilient legs are latched onto the latch portions so as not to be removed in a removing direction of the resilient legs when the resilient legs are inserted into the connector housing through the leg insertion opening portions. The latch portions are formed so as to allow the latching pawls latched thereonto to be moved in one axial direction and to be unlatched therefrom when the latching pawls are pushed by the annular projecting portion that is engaged with the engaging claw of the retainer. The connector housing is formed so as to allow the resilient legs to be withdrawn through the opening portions when the resilient legs are deformed or displaced until the latching pawls are unlatched from the latch portions in one axial direction. When the latching pawls are pushed by the annular projecting portion engaged with the engaging claw of the retainer, the resilient legs are deformed or displaced until the latching pawls are moved in one axial direction to be unlatched from the latch portions. The latching pawls are pushed by the annular projecting portion of the mating pipe directly or via other parts of the resilient legs.

The connector housing may be provided with guide recesses for receiving slide portions of the resilient legs that are inserted through the opening portions therein and guiding the resilient legs (or the slide portions) inwardly in the connector housing, for example, inwardly in the connector housing and in a direction perpendicular to an axis. The latch portions may be provided on the other axial end with respect to the guide recesses inside the connector housing, and provided to allow the latching pawls of the resilient legs inserted in the connector housing along the guide recesses (or the latching pawls inserted in the connector housing along the guide recesses) to be moved in the other axial direction and to be latched onto the latch portions by installing means between the checker and the connector housing part (for example, the connector housing or the retainer). The slide portions of the resilient legs fit in the guide recesses, and as the resilient legs are inserted in the connector housing, the slide portions move or slide along the guide recesses inwardly in the connector housing, for example, inwardly in the connector housing and in the direction perpendicular to the axis. The slide portions may be the latching pawls. The installing means may have protruding portions or thick-walled portions that are formed on middle portions or root ends of the resilient legs so as to protrude in one axial direction.

A checker according to the present invention may be configured as follows. The checker is capable of being installed in a quick connector. The quick connector has a tubular connector body having a connecting portion to a piping tube on one axial end of the connector body and a connector housing including a retainer holding portion on the other axial end thereof, and a retainer held in the retainer holding portion for snap-engaging with an annular projecting portion of the mating pipe. The checker comprises a pair of resilient legs to be inserted through resilient leg insertion opening portions formed in the connector housing from leading ends thereof, and latching pawls formed on leading end portions of the pair of the resilient legs, respectively, for being latched onto latch portions provided inside the connector housing not to be removed in a removing direction of the resilient legs when the resilient legs are inserted in the connector housing through the opening portions. When the annular projecting portion of the mating pipe is snap-engaged with the retainer, the latching pawls are moved in one axial direction by being pushed by the annular projecting portion until unlatched from the latch portions.

In the present invention, the checker may be configured to be installed in the connector housing by inserting the resilient legs in the connector housing, for example, in a direction perpendicular to an axis, and then moving the latching pawls in the other axial direction to be latched onto the latch portion. And, when the mating pipe is completely inserted in the connector housing, the latching pawls are pushed by the annular projecting portion, and are moved in one axial direction (axially inward direction), whereby the checker is removable from the connector housing. The latching pawls may be configured to be latched onto the latch portions in a manner such that the latching pawls engage with the latch portions hardly to be dislodged therefrom in one axial direction.

In the present invention, for example, the checker is installed in the connector housing in a manner such that entire resilient legs, generally entire resilient legs or major parts of the resilient legs are located inside the connector housing. And, the latching pawls may be provided on the leading end portions of the resilient legs so as to project (for example, in forms of outwardly directed pawls projecting outwardly in a widthwise direction of the checker or toward the tubular wall of the connector housing). Further, the resilient legs may be provided with protruding portions or thick-walled portions on middle portions or root ends of the resilient legs so as to protrude in one axial direction. Here, the protruding portions or thick-walled portions enter in the opening portions while being pressed against one axial end of the opening portions when the resilient legs are inserted in the connector housing through the opening portions. And, the resilient legs inserted through the opening portions may be guided in the connector housing in a mariner such that the latching pawls are received in guide recesses formed in the connector housing. And, the protruding portions or thick-walled portions may enter in the opening portions to curve the resilient legs in arch shapes while the latching pawls being fitted in the guide recesses, and the arch shaped resilient legs may spring back so as to snappingly move the latching pawls in the other axial direction when the arch shaped resilient legs are inserted in the connector housing until the latching pawls pass through the guide recesses. Here, insertion guide surfaces may be formed on leading ends of the protruding portions or the thick-walled portions and the insertion guide surfaces extend in the other axial direction at an angle toward the leading edges of the resilient legs.

In the present invention, the latching pawls may be provided with removal guide surfaces on surfaces of the latching pawls facing a removing direction of the resilient legs on the other axial ends thereof, and the removal guide surfaces extend in the other axial direction at an angle toward the leading edges of the resilient legs. And, the latching pawls may be latched onto the latch portion in a manner such that the latching pawls are not dislodged from the latch portions in a direction opposite to a projecting direction of the latching pawls or in a direction perpendicular to an axis. The checker or the checker and the connector housing may be provided with positioning means for positioning the root ends of the resilient legs so as not to be displaced in the other axial direction or an axial direction when or before the protruding portion or thick-walled portion enter in the opening portions.

Operation and Effect of Invention

As stated above, in the present invention, inserted portions of the resilient legs of the checker is held inside by the connector housing or inside the connector housing by inserting the resilient legs through the opening portions formed in the connector housing into the connector housing from the leading ends thereof. According to the present invention, the resilient legs can be received in the connector housing, for example, generally entirely, thereby appearance or visual quality of the checker installed in the quick connector is good.

And, the present invention can solve a problem of need for securing additional space for the resilient legs around the connector housing due to exposure of entire resilient legs on the outer peripheral surface of the connector housing in a projecting manner therefrom, increase design freedom in a piping layout, and eliminate fear that peripheral components and articles hit the resilient legs during piping work and thereby the checker is removed from the connector housing although the mating pipe is not completely inserted in the connector housing.

The present invention has another feature that at insertion of the mating pipe, the resilient legs are resiliently deformed axially inwardly by the annular projecting portion on the outer peripheral surface of the mating pipe, thereby the latching pawls of the checker are unlatched from the latching portions of the connector housing to allow the checker to be removed out of the connector housing. And, in this arrangement, the checker can be easily removed out of the connector housing by insertion of the mating pipe, although the pair of the resilient legs are received in the connector housing, for example, generally entirely.

And, according to the present invention, since the latching pawls are unlatched from the latching portions due to resilient deformation of the resilient legs axially inwardly of the connector housing and thereby the checker is removable from the connector housing, can be solved the problem in the conventional checker shown in FIGS. 24 and 25 that an additional space is further required around the connector housing for allowing the pair of resilient legs to spread apart radially at removal of the checker.

Here, the checker may be provided with a handle portion for exerting a force to remove the checker out of the connector housing.

According to the present invention, the latching pawls of the checker take forms of outwardly directed pawls and the latch portions inside the connector housing take, for example, forms of inwardly directed latch portions. Further, the connector housing may be provided internally with insertion guides for guiding movement of the latching pawls inserted through the opening portions to a stop position or latch position with respect to the latch portions (position allowing latching onto the latch portions, for example, just by moving the latching pawls in an axial direction), and also provided internally with removal passage ways axially inwardly from the insertion guides and the latch portions, for pulling out the latching pawls unlatched from the latch portions. In this configuration, the latching pawls can be easily unlatched from the latch portions due to resilient deformation of the resilient legs in the axial direction, and thereby the resilient legs can be pulled out of the connector housing, that is, the checker that has been installed in the connector housing can be taken out of the connector housing.

In this case, the removal passage way may take a form of a recess extending in a direction perpendicular to an axis to the leg insertion opening portion.

In the present invention, the releasing portion of the checker may be formed on the leading end portion of the resilient leg so as to protrude in the axial direction facing the annular projecting portion of the mating pipe.

In this configuration, the releasing portion can abut the annular projecting portion of the mating pipe immediately before the mating pipe reaches a completely inserted position. And, following further insertion of the mating pipe, the resilient leg can be largely resiliently deformed in axially inward direction. Thereby latching pawls can be more easily or surely unlatched from the latch portions when the mating pipe is completely inserted in the connector housing.

According to the present invention, the connector housing as a whole may be provided with a pair of sets of the leg insertion opening portions and a pair of sets of the latch portions in opposed relation to each other at two positions of the connector housing circumferentially spaced 180° from each other.

In this configuration, when an orientation or angular position of the quick connector is changed according to difference in piping layout or other piping conditions, a worker can select the opening portions convenient for connecting work to insert the resilient legs of the checker into the connector housing therethrough, and thereby the worker can effectually remove the checker out of the quick connector in actual piping work, specifically connecting work of the mating pipe and the quick connector.

According to the present invention, the checker may have a base portion which connects root ends of the pair of the resilient legs each other, and a restraining portion projecting from the base portion in an extending direction of the resilient legs, and the connector housing may have a restraining hole which cooperates with the restraining portion inserted therein to stabilize a posture of the checker installed therein. In this configuration, the checker can be installed and held in the connector body in the stable posture under restraint by the restraining portion and the restraining hole, it can be more surely prevented that the latching pawls are accidentally unlatched from the latch portions due to tilting, rattling or any other motion of the checker.

Here, the restraining portion may take a form of a thin plate (tongue), and the restraining hole may take a form of a slit corresponding to the restraining portion.

And, the above-mentioned handle or handle portion may be provided on the base portion.

Insertion guides or guide recessed portions may be provided in the connector housing for guiding the resilient legs inwardly in the connector housing, enabling the resilient legs to be inserted to a predetermined position in the connector housing stably. The guide recessed portion may be formed on one axial side with respect to the insertion guide. The guide recessed portion can serve also as a removal passage way. And the latch portion may be formed, for example, on an inner end portion or a leading end portion of the insertion guide, and the latch portion may be an inner end surface or a leading end surface of the insertion guide. Here, the resilient legs have slide portions and the resilient legs are inserted through the opening portions in the connector housing so as to move the slide portions along the insertion guides or in the guide recessed portions while being received therein. The slide portions may be latching pawls. And, the resilient legs are inserted in the connector housing, for example, until the latching pawls pass through the insertion guides or the guide recessed portions. Upon passing through the insertion guides or the guide recessed portions, for example, the latching pawls become movable in the other axial direction, and are moved in the other axial direction until latched onto the latch portions, for example, formed on leading end portions or leading end surfaces of the insertion guides. In order to move the latching pawls in the other axial direction, installing means for moving the latching pawls in the other axial direction may be constructed or provided, for example, between the checker and a part of the connector housing. The installing means may have protruding portions or thick-walled portions formed on the resilient legs. Here, the resilient legs are inserted into the opening portions, for example, so as to follow regions or surfaces of leading ends of the resilient legs facing one axial direction over one axial sides or one axial edges of the opening portions. As soon as the protruding portions or thick-walled portions of the resilient legs come on and enter in the opening portions, the resilient legs are pushed and displaced in the other axial direction by a protruding length of the protruding portions or thick-walled portions. Here, when the latching pawls of the resilient legs are restrained from movement in the other axial direction by the insertion guides or the guide recessed portions and roots of the resilient legs or the connecting portion (base portion) of the resilient legs is also restrained from movement in the other axial direction, the resilient legs are curved slightly in arch shapes (the latching pawls are urged in the other axial direction). In this state, when the resilient legs are inserted in the connector housing until the latch pawls pass through the insertion guides or the guide recessed portions, the resilient legs spring back so as to move snappingly the latching pawls in the other axial direction, and the latching pawls are snappingly latched onto the latch portions. Positioning means for restraining the roots of the resilient legs or the connecting portion (base portion) of the resilient legs from being displaced in the other axial direction or in an axial direction, serves to position the roots of the resilient legs or the connecting portion of the resilient legs in the other axial direction or in the axial direction, for example, when the protruding portions or thick-walled portions enter in the opening portions, preferably before the protruding portions or thick-walled portions enter in the opening portions. For the positioning means, tilt prevention means for preventing the checker from tilting in the axial direction may be applied. For example, the tilt prevention means are constructed by a restraining portion projecting from the base portion connecting the resilient legs in an extending direction of the resilient legs, and the restraining hole formed in the connector housing in which the restraining portion is inserted without or almost without axial clearance.

The tilt prevention means are configured in a manner such that the restraining portion is inserted and enters in the restraining hole when the protruding portions or thick-walled portions enter in the opening portions, preferably before the protruding portions or thick-walled portions enter in the opening portions. Here, when the mating pipe is completely inserted in the connector housing, the latching pawls are pushed by the annular projecting portion of the mating pipe, the latching pawls are located at exits of the guide recessed portions, and the resilient legs can be removed out of the connector housing. When insertion guide surfaces may be formed on leading ends of the protruding portions or thick-walled portions, the protruding portions or thick-walled portions are allowed to enter smoothly into the opening portions. The positioning means or tilt prevention means serve to position the roots of the resilient legs or the connecting portion of the resilient legs not to be displaced in the other axial direction or in the axial direction, for example, while keeping the roots or the connecting portion being tilted in the other axial direction or being tilted slightly. In this configuration, when the latching pawls are snappingly moved in the other axial direction and latched onto the latch portions, the checker is installed in a part of the connector housing without being tilted in the axial direction.

When the latching pawls engage with the latch portions so as not to be dislodged from the latch portions in directions opposite to projecting directions of the latching pawls, the latching pawls are not allowed to be easily dislodged from the latch portions, for example, inwardly, and when the latching pawls engage with the latch portions so as not to be dislodged from the latch portion in one axial direction, the latching pawls are not allowed to be easily dislodged from the latch portions in one axial direction. And, when the removal guide surfaces are formed on the latching pawls, it can be prevented that the other axial end portions of the latching pawls are caught on the latch portions during removal of the checker and removal of the checker is disturbed.

BEST MODE FOR CARRYING OUT THE INVENTION

Now, the embodiments of the present invention will be described in detail with reference to the drawings.

In FIGS. 1 to 5, reference numeral 10 indicates a quick connector in a quick connection device according to a first embodiment, reference numeral 12 indicates a mating pipe to be connected with a tube made of resin, etc. for piping, via the quick connector 10.

The mating pipe 12 is a metal pipe here, and provided with an annular projecting portion 14 on an outer peripheral surface at a position near a leading end thereof.

Reference numeral 15 indicates a tubular connector body comprising a main body of the quick connector 10. Here, the connector body 15 is entirely made of resin and in a form of an elbow.

The connector body 15 has a nipple portion (press-fit portion) 16 as a connecting portion to a tube on one axial end thereof, a connector housing 20 on the other axial end thereof, and the connector housing 20 has a retainer holding portion 18.

Inside the connector housing 20, elastic O-rings 22 as sealing rings are retained together with a resin middle ring 24 and a resin bush 26.

As shown in FIG. 4, the bush 26 is formed with a lot of slits 28 spaced circumferentially at intervals of a predetermined pitch.

Further, the bush 26 is formed with an annular fitting projection 29 on an outer peripheral surface thereof, and the annular fitting projection 29 resiliently fits in an annular fitting groove 30 that is formed in an inner peripheral surface of the connector housing 20.

The bush 26 is retained and fixed in an axial direction due to fitting relation between the fitting projection 29 and the fitting groove 30.

The above nipple portion 16 is formed with a plurality of annular ribs 32 of saw-edged cross-sections with acute angled peaks around an outer peripheral surface thereof.

These annular ribs 32 bite in an inner surface of a tube to provide a stop with respect to the tube when the nipple portion 16 is press-fitted in the tube.

At a root of the nipple portion 16, a flange portion 34 is formed for controlling a press-fit length of the nipple portion 16 in the tube.

The above retainer holding portion 18 of the connector housing 20 takes a form of a socket shape as a whole. Inside the retainer holding portion 18, a resin retainer 36, separate from the connector body 15, is held for providing a lock for the mating pipe 12 by engaging with the annular projecting portion 14 of the mating pipe 12.

Here, the retainer 36 is held and securely fixed axially in a groove 38 of the retainer holding portion 18.

In the connector housing 20, a checker 40 is installed, axially behind the retainer 36 (on the right side in the Figure) for verifying complete insertion of the mating pipe 12, and the checker 40 comprises the quick connection device, together with the quick connector 10.

That is, the quick connection device is a checker-installed quick connector constructed by adding the checker 40 in the connector body 15 of the quick connector 10.

The above retainer 36 is made of resin, has a single piece construction and takes a form of an annular shape as a whole, as shown in FIG. 9.

Specifically, the retainer 36 has a pair of claw portions 42 opposed in a direction perpendicular to an axis (opposed in a vertical direction in the Figure), a pair of release operating portions 44 opposed to each other in a direction perpendicular to an axis and located 90° apart from the claw portions 42, respectively, and thin-plate like springs 46 bridging between the claw portions 42 and the release operating portions 44, respectively.

The pair of the claw portions 42 are thick-walled, and are provided with inwardly directed (radially inwardly directed) engaging claws 48 on inner peripheral sides thereof.

The retainer 36 serves to lock the mating pipe 12 by engaging these engaging claws 48 with the annular projecting portion 14 of the mating pipe 12 in an axial direction as shown in FIG. 1.

The claw portion 42 also includes a cam surface 50 of a slant shape on a front (the left side in the Figure) of the engaging claw 48, continuously from the engaging claw 48, namely on an entrance end for inserting the mating pipe 12.

These cam surfaces 50 serve to guide the annular projecting portion 14 for movement thereof while the mating pipe 12 being inserted in the connector housing 20 in the axial direction and to spread apart the pair of the claw portions 42 in a mutually separating direction, namely in a radially outward direction with resilient deformation of the springs 46 as the annular projecting portion 14 advances in the connector housing 20.

On the other hand, the release operating portion 44 is thick-walled and of a rectangular shape in a plan view.

These release operating portions 44 are portions for exerting operating force to disengage the engaging claws 48 from the annular projecting portion 14. Under the operating force exerted, these release operating portions 44 move in mutually approaching directions whereby the pair of the engaging claws 48 are spread radially outwardly with resilient deformation of the springs 46 to disengage the engaging claws 48 from the annular projecting portion 14 that engaged with the engaging claws 48.

As shown in FIG. 5, the connector housing 20 has a pair of opening portions 52 apertured through a tubular wall thereof from outside to inside, on right and left ends in the Figure, and having shapes corresponding to the release operating portions 44. The retainer 36 is set in the retainer holding portion 18 so as to locate the release operating portions 44 in these opening portions 52, respectively. Fitting of the release operating portions 44 in the opening portions 52 also serves to position the retainer 36 in the axial direction.

Here, the retainer 36 is inserted into the connector housing 20, specifically into the retainer holding portion 18, from one of the pair of the disengaging portions 44 through the opening portions 52 in a direction perpendicular to an axis with the pair of the claw portions 42 being pushed and pressed in a direction P in FIG. 9, and is set in a predetermined attached position.

FIG. 4 shows a state before insertion of the mating pipe 12, and in this state, the mating pipe 12 is inserted in the connector housing 20 in a right direction in FIG. 4.

When the mating pipe 12 is inserted in the connector housing 20 a certain length, the annular projecting portion 14 of the mating pipe 12 abuts the slant cam surfaces 50 of the claw portions 42 of the retainer 36.

Then, when the mating pipe 12 is further inserted, the annular projecting portion 14 further advances in the right direction in the Figure, whereby the pair of the claw portions 42 spread apart in a radial direction (in a vertical direction in FIGS. 4 and 9) due to guiding function (cam function) of the slant cam surfaces 50.

As soon as the annular projecting portion 14 passes through between the engaging claws 48 of the retainer 36, the claw portions 42 contract radially inwardly, and the engaging claws 48 engage with the annular projecting portion 14 in the axial direction as shown in FIG. 1.

Here, the mating pipe 12 is locked against movement in a left direction in FIG. 1.

At that time, as shown in FIG. 1, an outer peripheral surface of the mating pipe 12 fits to the seal rings 22 and the bush 26 that are held within the connector housing 20, and thereby an air-tight seal is provided between the mating pipe 12 and the connector housing 20.

The above checker 40 has a single piece construction, is made of resin, and as a whole in a form of a gate shape, as shown in FIGS. 3, 7 and 10.

As shown in FIG. 10 in detail, the checker 40 has a pair of resilient legs 58 extending parallel to each other, and a base portion 60 of an arch shape connecting root ends of the resilient legs 58. The base portion 60 is provided with a handle 62 of a ring shape.

A tongue like restraining portion 68 projects in an extending direction of the resilient legs 58 from the base portion 60, more specifically from a widthwise center and one axial end of an inner surface of the base portion 60.

The pair of the resilient legs 58 have outwardly directed latching pawls 64 projecting toward the tubular wall of the connector housing 20 on leading end portions thereof, respectively. These latching pawls 64 are latched onto latch portions 80 that are provided in an inner peripheral surface or inner surface of the connector housing 20 as will be described hereinafter.

On front surfaces of the pair of these resilient legs 58, namely on surfaces of the resilient legs 58 on an entrance for inserting the mating pipe 12, releasing portions 66 are formed for unlatching the latching pawls 64 from the latch portions 80 on a part of the connector housing 20 by resiliently deforming the resilient legs 58 in the axial direction (an axial direction of the connector housing 20) due to abutment with the annular projecting portion 14.

In the present embodiment, the releasing portions 66 are formed by protruding parts of the resilient legs 58 toward the annular projection portion 14.

In each of the pair of the resilient legs 58, a lower portion 72 on a leading end of the resilient leg 58 is thinner-walled than an upper portion 70 (root end) near the base portion 60. Namely, a thick-walled portion 71 is formed on one axial side of the upper portion 70, and the thick-walled portion 71 protrudes in one axial direction with respect to the lower portion 72. The base portion 60 and the upper portion 70 have equal thickness.

As shown in FIGS. 3 and 8, the connector housing 20 is formed with a pair of opening portions 74 apertured through the tubular wall from outside to inside for inserting the resilient legs 58 of the checker 40 therethrough, and a restraining hole 76 shaped of a slit and apertured through the tubular wall from outside to inside for inserting the tongue like restraining portion 68 hanging down from the base portion 60 in FIG. 10 therethrough.

The checker 40 is installed in the connector housing 20 in such manner that the pair of the resilient legs 58 are inserted into the connector housing 20 via corresponding opening portions 74, respectively, while the restraining portion 68 being inserted into the connector housing 20 via the restraining hole 76.

Here, in the installed state shown in FIG. 4, the checker 40 is installed in the connector housing 20 in a manner such that the pair of the resilient legs 58 are located on the right with respect of the retainer 36 in the Figure, namely inwardly from the retainer 36 in an inserting direction of the mating pipe 12.

As shown in FIG. 8, the connector housing 20 is formed with window portions 78 apertured through the tubular wall from outside to inside, continuously from and behind the rectangular opening portions 52 (on the right with respect to the rectangular opening portions 52 in the Figure) in which the release operating portions 44 of the retainer 36 are fitted, respectively. The window portions 78 have latch portions 80 on upper edge portions in the Figure onto which the outwardly directed latching pawls 64 of the checker 40 are latched.

And, an insertion guide 82 is formed continuously from each of the latch portions 80 so as to extend in a direction perpendicular to an axis for guiding the resilient legs 58 that are inserted through the opening portions 74, specifically the outwardly directed latching pawls 64 to the latch portions 80.

And, behind the insertion guide 82 (on the right with respect to the insertion guide 82 in FIG. 8 (B)), a withdrawal passage way 84 of a recessed shape is formed so as to extend to the opening portion 74 in the direction perpendicular to the axis, for the latching pawls 64.

The withdrawal passage ways 84 are continued to the window portions 78 and the opening portions 74, respectively, for the purpose of pulling out the latching pawls 64 via the opening portions 74 that has have been unlatched from the latch portions 80 due to resilient deformation of the resilient legs 58 in an axially inward direction.

Here, between a left end of the insertion guide 82 and a stop wall 87 on a right side (an inner end) of the withdrawal passage way 84 in the Figure secured is a resilient deformation gap or clearance gap 81, defined by the window portion 78 and the latch portions 80 for allowing resilient deformation of the leading end portions of the resilient legs 58 of the checker 40 in the axial direction that is inserted into the connector housing 20. The stop wall 87 defines one side wall of the guide recessed portion 84.

That is, each of the opening portions 74 has a rectangular (for example, generally square) main opening 75 and a small rectangular (for example, generally square) transit portion 77 that is continued from one axial end of a radially outer edge of the main opening 75 so as to protrude radially outwardly. The connector housing 20 has a pair of inner surfaces extending parallel to each other in a direction perpendicular to an axis (in a direction perpendicular to a paper surface in FIG. 8 (A)) corresponding to contours of the radially outer edges of the opening portions 74. These inner surfaces terminate at the window portions 78, respectively, and define guide recessed portions (withdrawal passage ways) 84 corresponding to the transit portions 77, and insertion guides 82 on the other axial ends thereof continuously to the guide recessed portions 84. And, inner end surfaces or leading end surfaces of the insertion guides 82 define latch portions 80, and a distance between bottom surfaces 79 of the pair of the guide recessed portions 84 is set equal to or generally equal to a distance between outer ends of the latching pawls 64 of the checker 40.

In this embodiment, as shown in FIG. 6, the checker 40 is placed above the connector housing 20 in the Figure, and the pair of the resilient legs 58 are inserted into the connector housing 20 via the corresponding pair of the opening portion 74 of the connector housing 20 from their leading ends. Then, for example, while the resilient legs 58 being slightly flexed inwardly, the outwardly directed latching pawls 64 are guided by the insertion guides 82 formed inside the connector housing 20 and reach positions of the latch portions 80, respectively, and the latching pawls 64 are latched onto the latch portions 80 in the direction perpendicular to the axis as shown in FIG. 7, whereby the checker 40 is locked in the direction perpendicular to the axis. Namely, the checker 40 is installed in the connector housing 20.

That is, the resilient legs 58 of the checker 40 are put into the connector housing 20 through the opening portions 74 so as to let the latching pawls 64 through the transit portions 77, and the resilient legs 58 are further inserted in the connector housing 20 with outer surfaces of one axial ends of the lower portions 72 following one axial end edges of the opening portions 74 so as to move the latching pawls 64 along the guide recessed portions 84 in the direction perpendicular to the axis. Here, the resilient legs 58 are slightly tilted with leading ends of the resilient legs 58 being displaced in one axial direction or root ends of the resilient legs 58 being displaced in the other axial direction to allow the restraining portion 68 of the checker 40 to enter in the restraining hole 76. And, when the upper portions 70 (leading ends of the upper portions 70) enter in the opening portions 74, since the upper portions 70 is provided with the thick-walled portions 71 formed thick in one axial direction, portions of the resilient legs 58 on upper portion ends or leading ends of the upper portions 70 (center portions of the resilient legs 58) are slightly displaced in the other axial direction. However, since the latching pawls 64 engage with the guide recessed portions 84 or the insertion guides 82, the latching pawls 64 cannot move (or almost cannot move) in the other axial direction. And since the restraining portion 68 is inserted in the restraining hole 76 without clearance or generally without clearance in the axial direction, the base portion 60 cannot move (or almost cannot move) in the other axial direction, either. Therefore, the resilient legs 58 are slightly (or a little bit) flexed and protruded in the other axial direction so as to urge the latching pawls 64 in the other axial direction. In this state, when the resilient legs 58 are further inserted into the connector housing 20, the latching pawls 64 pass through the guide recessed portions 84. Then, the resilient legs 58 spring back, and the latching pawls 64 snappingly move in the other axial direction so as to be latched onto the latch portions 80. And, generally simultaneously with latching of the latching pawls 64 onto the latch portions 80, the base portion 60 of the checker 40 contacts an outer peripheral surface of the connector housing 20.

At that time, the tongue like restraining portion 68 projecting from the base portion 60 is fitted in the corresponding slit-shaped restraining hole 76 of the connector housing 20, to its root. The restraining portion 68 and the restraining hole 76 cooperatively restrain the checker 40 in the connector housing 20 and the checker 40 is held in a stable installed posture without being tilted in the axial direction.

Meanwhile, for example, in this installed state, the thick-walled upper portions 70 of the resilient legs 58 are fitted in the opening portions 74 or main openings 75 without clearance or generally without clearance, and are restrained by the opening portions 74 in all directions including the axial direction.

The checker 40 functions as follows at insertion of the mating pipe 12.

FIG. 11 specifically shows how the checker 40 functions.

In the present embodiment, when the mating pipe 12 is inserted into the connector housing 20 in a right direction in FIG. 4, the annular projecting portion 14 first abuts the slant cam surfaces 50 of the retainer 36 held in the retainer holding portion 18, the annular projecting portion 14 passes through between the inwardly directed engaging claws 48 while spreading apart the slant cam surfaces 50, and immediately after that, the annular projecting portion 14 is engaged with the engaging claws 48 and is locked in the axial direction.

And, just before the annular projecting portion 14 gets through the engaging claws 48 and moves in the right direction in FIG. 4, the releasing portions 66 on the leading end portions of the resilient legs 58 of the checker 40 abut the annular projecting portion 14 as shown in FIG. 11 (I), and then the pair of the resilient legs 58 of the checker 40 or the leading ends of the resilient legs 58 are resiliently deformed in an axially inward direction by the annular projecting portion 14 that is advancing further in the connector housing 20. Here, for example, the thick-walled portion 71 abuts or contact with one axial edge of the opening portion 74.

And, thereby the latching pawls 64 of the checker 40 latched onto the latch portions 80 of the connector housing 20 are unlatched from the latch portions 80 as the resilient legs 58 are resiliently deformed in the axial direction, as shown in FIG. 11 (II).

The latching pawls 64 unlatched from the latch portions 80 reach positions of the guide recessed portions or withdrawal passage ways 84 located inward from the insertion guides 82 in the connector housing 20 when the mating pipe 12 is completely inserted in the connector housing 20. At that time, when the handle 62 of a ring shape is grasped and the checker 40 is pulled in a direction opposite to an inserting direction of the checker 40, namely in an upward direction in FIG. 7, the latching pawls 64 are pulled out of the opening portions 74 in the direction perpendicular to the axis through the withdrawal passage ways 84.

Namely, the checker 40 is removed from the connector housing 20 in the direction perpendicular to the axis as indicated in FIG. 12.

As stated above, in this embodiment, the resilient legs 58 of the checker 40 are inserted into the connector housing 20 from their leading ends through the opening portions 74 formed in the connector housing 20, and inserted portions of resilient legs 58 that comprise, for example, generally whole of the resilient legs 58 are held inside the connector housing 20. So, when the checker 40 is installed, the resilient legs 58 can be received inside the connector housing 20 for example, generally entirely.

So, this configuration gives the quick connection device a simple and good appearance or look when the checker 40 is installed. And, since the resilient legs 58 project not entirely from an outer peripheral surface of the connector housing 20, it is not necessary to secure an additional space for the resilient legs 58 around the connector housing 20. Therefore, design freedom in piping layout can be increased, and eliminated is the fear that during piping work, peripheral components or articles hit against the resilient legs 58 and thereby the checker 40 is accidentally removed from the connector housing 20 although the mating pipe 12 is not completely inserted in the connector housing 20.

Further, in the present embodiment, at insertion of the mating pipe 12, the annular projecting portion 14 resiliently deforms the resilient legs 58 axially inwardly to unlatch the latching pawls 64 of the checker 40 from the latch portions 80 of the connector housing 20 whereby the checker 40 becomes removable from the connector housing 20. So, although the pair of the resilient legs 58 are received within the connector housing 20, for example, generally entirely, the checker 40 is allowed to be easily removed out of the connector housing 20 by insertion of the mating pipe 12.

And, in the present embodiment, due to resilient deformation of the resilient legs 58 in the axial direction within the connector housing 20, the latching pawls 64 are unlatched from the latch portions 80 whereby the checker 40 becomes removable from the connector housing 20. Therefore, compared to the case of removing a checker by spreading apart a pair of resilient legs radially, it is not necessary to secure an additional space for allowing the resilient legs to spread apart around the connector housing 20, and thereby a necessary space around the connector housing 20 can be further reduced.

Moreover, in the present embodiment, since the releasing portions 66 of the leading end portions of the resilient legs 58 project toward the annular projecting portion 14 of the mating pipe 12, the releasing portions 66 are allowed to abut the annular projecting portion 14 at relatively early stage during insertion of the mating pipe 12, and this affords long distance move of the annular projecting portion 14 for resiliently deforming the resilient legs 58 in the axial direction.

This configuration allows achievement of easier unlatching of the latching pawls 64 from the latch portions 80.

According to this embodiment, the connector housing 20 is provided internally with the insertion guides 82 for guiding movement of the latching pawls 64 to the latch portions 80, and with the withdrawal passage ways 84 located axially inward from the insertion guides 82 for guiding withdrawal movement of the latching pawls 64. This configuration allows smooth installation and removal of the checker 40.

And, in this embodiment, the checker 40 is provided with the tongue-like restraining portion 68 on the base portion 60 thereof, the restraining portion 68 is fitted in the restraining hole 76 of the connector housing 20 which has a slit shape corresponding to the retaining portion 68. Thereby the checker 40 is allowed to be installed in the connector housing 20 in firmly restrained state and stabilized in an installed posture.

This configuration can more positively prevent that other articles, etc. hit the checker 40 whereby the checker 40 is tilted or changed in its posture and thereby the latching pawl 64 is accidentally unlatched from the latch portion 80.

Next, FIGS. 13 and 14 show a second embodiment of the present invention.

In this embodiment, a connector housing 20 as a whole is provided with a pair of sets of opening portions 74 for insertion of the resilient legs 58, a pair of sets of the latch portions 80, a pair of sets of insertion guides 82, a pair of sets of withdrawal passage ways 84, and a pair of the restraining holes 76 of slit shapes at two positions of the connector housing 20 circumferentially spaced 180° from each other in opposed relation to each other, respectively. In this case, the checker 40 can be inserted in and held within the connector housing 20 at either of positions spaced 180° from each other, in either one of opposite directions.

So, the checker 40 can be installed in the connector housing 20 selectively in one or the other direction so as to be held in the connector housing 20 at a position that is convenient for removal of the checker 40 during piping work. Thus, removal of the checker 40 can be more facilitated when the mating pipe 12 is inserted in the connector housing 20.

FIG. 15 shows a third embodiment of the present invention.

In this embodiment, a mating pipe 12 is further provided with another annular projecting portion, namely, secondary annular projecting portion 86 in addition to the above annular projecting portion 14.

As shown in FIG. 15 (B), the secondary annular projecting portion 86 is fitted in an opening on an axial end of the connector housing 20 for insertion of the mating pipe 12 to restrain the quick connector 10 and the mating pipe 12 from rattling each other, and thus can be achieved an advantage that the quick connector 10 and the mating pipe 12 are connected to each other more stably.

FIGS. 16 to 22 show a fourth embodiment of the present invention.

In the fourth embodiment, the latching pawls 64, the resilient legs 58, the restraining portion 68 and the handle 62 of the checker 40, the latch portions 80 and the restraining hole 76 of the connector housing 20, and the nipple portion 16 of the connector body 15 of the second embodiment are modified, and the rest of construction is the same as that of the second embodiment.

According to the fourth embodiment, the nipple portion 16 provided on one axial end of the connector body 15 extends parallel to a direction for connecting the release operating portions 44 of the retainer 36.

And, according to the fourth embodiment, installation guide surfaces 88 are formed on leading ends of the upper portions 70 (thick-walled portions 71) of the resilient legs 58 of the checker 40 so as to extend in the other axial direction at an angle toward the leading ends of the resilient legs 58. The latching pawls 64 of the resilient legs 58 pass through the guide recessed portions 84 to be snappingly latched onto the latch portions 80 when the installation guide surfaces 88 halfway or entirely enter in the opening portions 74. Each inner side of the leading end edge and root end edge of the installation guide surface 88 extends in an inward direction at an angle toward the root end, corresponding to a shape of one axial edge of the opening portion 74.

As shown in FIG. 21 (A), a latching surface 90 of the latching pawl 64 for being latched onto the latch portion 80 extends in a radially outward direction or widthwise outward direction at an angle toward a root of the resilient leg 58 (extends in a right direction at an angle upward in FIG. 21A) while the latch portion 80 extends also in the radially outward direction at an angle toward the root of the resilient leg 58 so as to correspond to the latching surface 90, thereby the latching pawl 64 or the latching surface 90 is engaged with the latch portion 80 not to be dislodged inwardly in a direction perpendicular to an axis, or in a direction of narrowing a distance between the resilient legs 58 in latched relation. And, the other axial end of the latching surface 90 of the latching pawl 64 defines a removal guide surface 92 that extends in the other axial direction at an angle toward the leading end of the resilient leg 58, and it is prevented by the removal guide surfaces 92 that the latching pawls 64 remain caught on the insertion guides 82 during removal of the checker 40. And, the latching surface 90 (more specifically, one axial end of the latching surface 90) extends in one axial direction at an angle toward the leading end of the resilient leg 58 while the latch portion 80 extends also in one axial direction at an angle toward the leading end of the resilient leg 58 so as to correspond to the latching surface 90, thereby the latching pawl 64 or the latching surface 90 engages with the latch portion 80 also not to be dislodged easily in one axial direction in latched relation. A slant angle each of the latching surface 90 and the latch portion 80 may be, for example, 2 to 10° with respect to the axis. And, the slant angle may differ between the latching surface 90 and the latch portion 80. For example, as shown in FIG. 21 (B), a slant angle of the latching surface 90 may be set higher than that of the latch portion 80. Meanwhile, as shown in FIG. 22, the latching pawl 64 may be formed with an engaging projecting portion 94 projecting in a removing direction of the resilient leg 58 on an outer end of the latching surface 90 while the latch portion 80 may be provided with an engaging recessed portion 96 on an outer end thereof for receiving the engaging projecting portion 94 therein, and thereby the latching pawl 64 is engaged with the latch portion 80 not to be dislodged radially inwardly in latched relation.

The handle 62 of the checker 40 is formed into a square annular body, and is formed with cutouts 100 inside the first and fourth corners so that the handle 62 is cut at any of the cutouts 100 when excessive pull forth is exerted to the handle 62. This configuration can solve a problem that the checker 40 is removed out of the connector housing 20 by pulling the handle 62 by force although the mating pipe 12 is not completely inserted in the connector housing 20.

The restraining portion 68 of the checker 40 is provided with a rib 102 extending along a widthwise center thereof, on a surface thereof facing in one axial direction. The restraining portion 68 is inserted in the restraining hole 76 with the rib 102 being fitted in the restraining recessed portion 104 that is formed in a center of one axial end edge of the restraining hole 76. Due to fitting of the rib 102 in the restraining recessed portion 104, the checker 40 is installed in the connector housing 20 stably in a widthwise direction.

The restraining portion 68 of the checker 40 is also provided with a raised line 106 on a surface thereof facing in the other axial direction for creating no play with respect to the retaining hole 76 while keeping an entire wall-thickness of the restraining portion 68 thin. And, the upper portion 70 of the resilient leg 58 is provided with a partial raised part 108 on a surface of the upper portion 70 facing in one axial direction for securing a sufficient protruding amount while keeping resiliency of the upper portion 70.

Moreover, in view of shock resistance against flying pebbles, etc. while a motor vehicle is moving, and collision safety, as shown in FIG. 23, an outer peripheral side wall portion 110 of the groove 38 of the retainer holding portion 18 may be formed thick radially outwardly to have a same thickness as that of a wall portion therearound. Meanwhile, reference numeral 112 in FIG. 23 indicates a stopper when a leading end portion of the mating pipe 12 with respect to the annular projecting portion 14 is long, and the stopper functions to prevent excess insertion of the mating pipe 12 by abutting the leading edge of the mating pipe 12. Modification of the connector housing 20 here may be applied to all of the embodiments.

Although the embodiments of the present invention have been described in detail above, these are only some of examples.

For example, the quick connectors 10 shown in the above embodiments are only some of examples. The present invention may be applied for a quick connector as shown in FIG. 23 where a retainer is axially inserted in and held in a connector body.

In addition, in the above embodiments, the releasing portion is in a form of a raised portion on a leading end portion of the resilient leg. However, according to the circumstances, the releasing portion may be in a form of non-raised portion. The present invention may be constructed in variously modified configurations without departing from the scope of the present invention.

INDUSTRIAL APPLICABILITY

As stated above, the quick connector and the checker according to the present invention are suitable for use, for example, in a narrow piping space in a motor vehicle.

EXPLANATION OF NUMERAL REFERENCES

Figure 1:
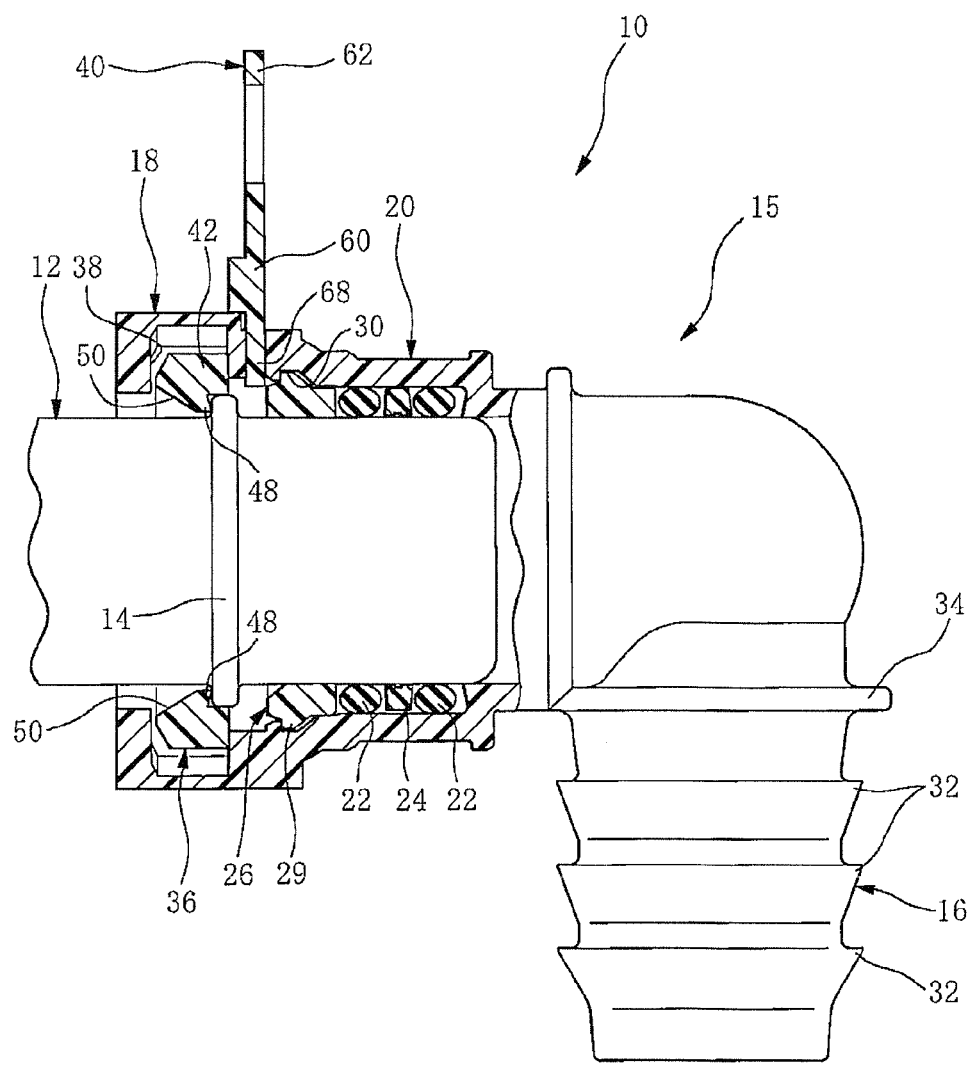
FIG. 1 is a partly broken view of a quick connection device of a first embodiment of the present invention, showing a state that a mating pipe is connected to a quick connector.
Figure 2:
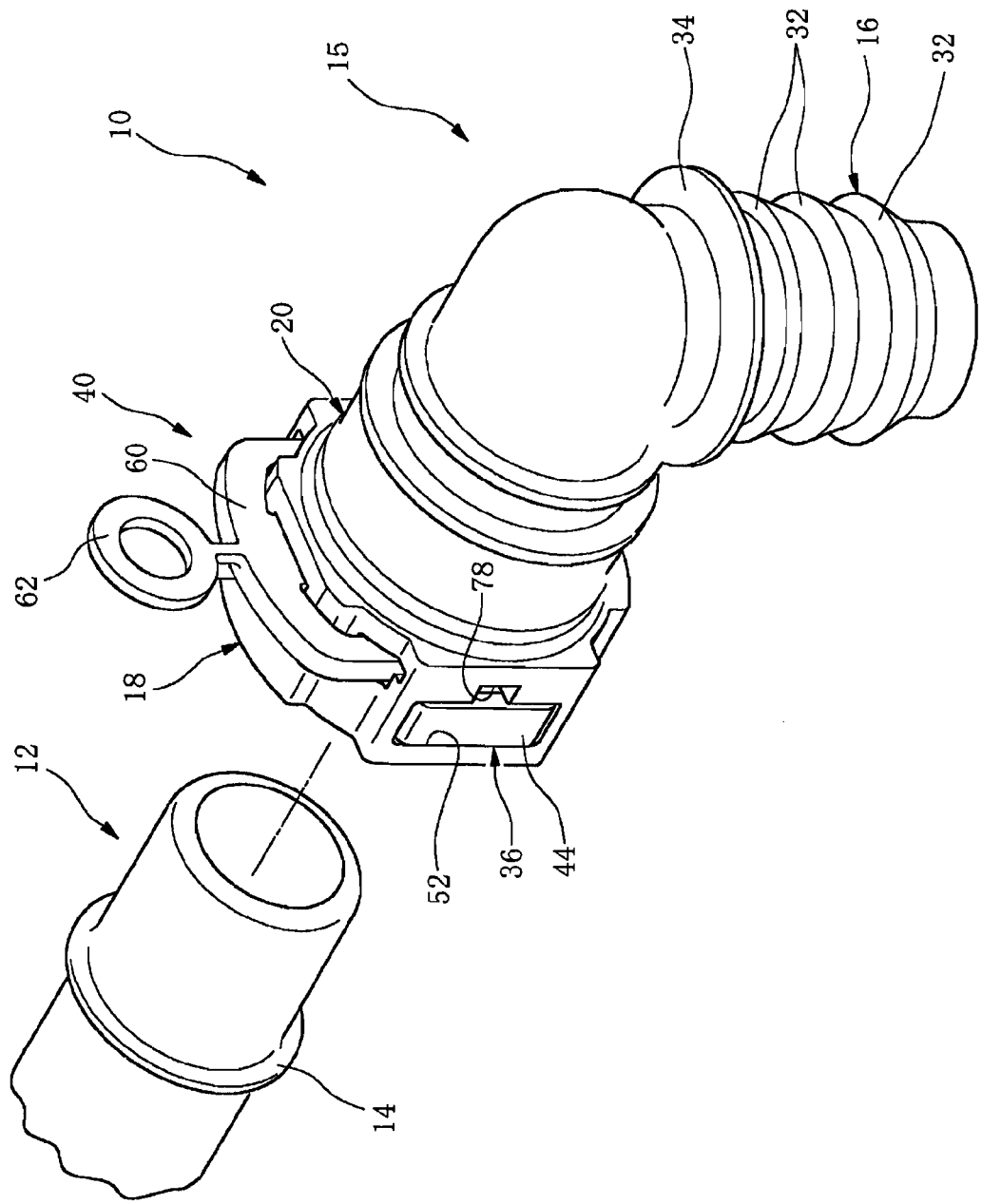
FIG. 2 is a view of an appearance of the quick connection device of the embodiment showing a state before insertion of the mating pipe.
Figure 3:
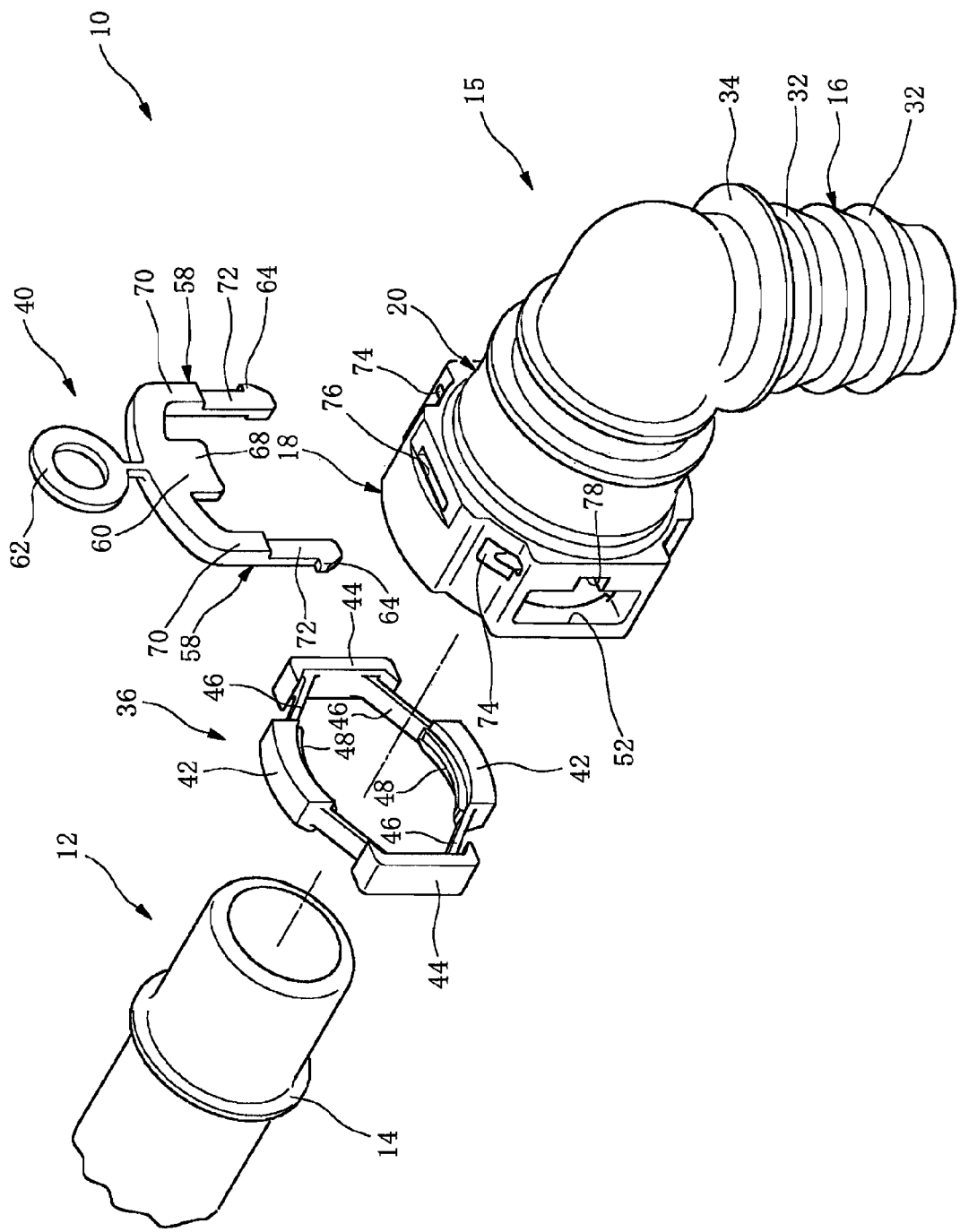
FIG. 3 is a view of the quick connection device of FIG. 2 showing a state that a checker and a retainer are removed.
Figure 4:
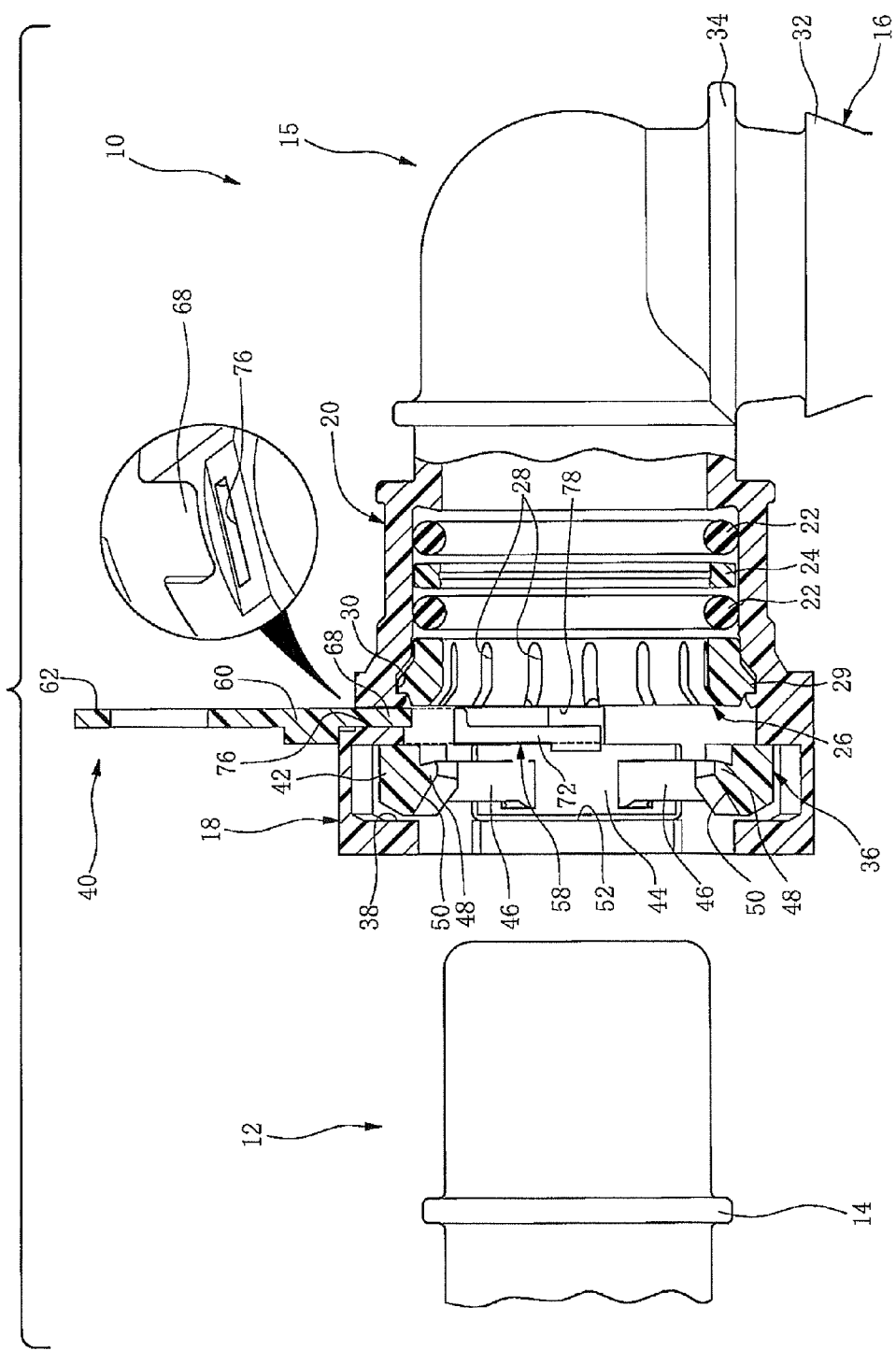
FIG. 4 is a sectional view of a relevant part of the quick connection device of the embodiment, showing a state before insertion of the mating pipe.
Figure 5:
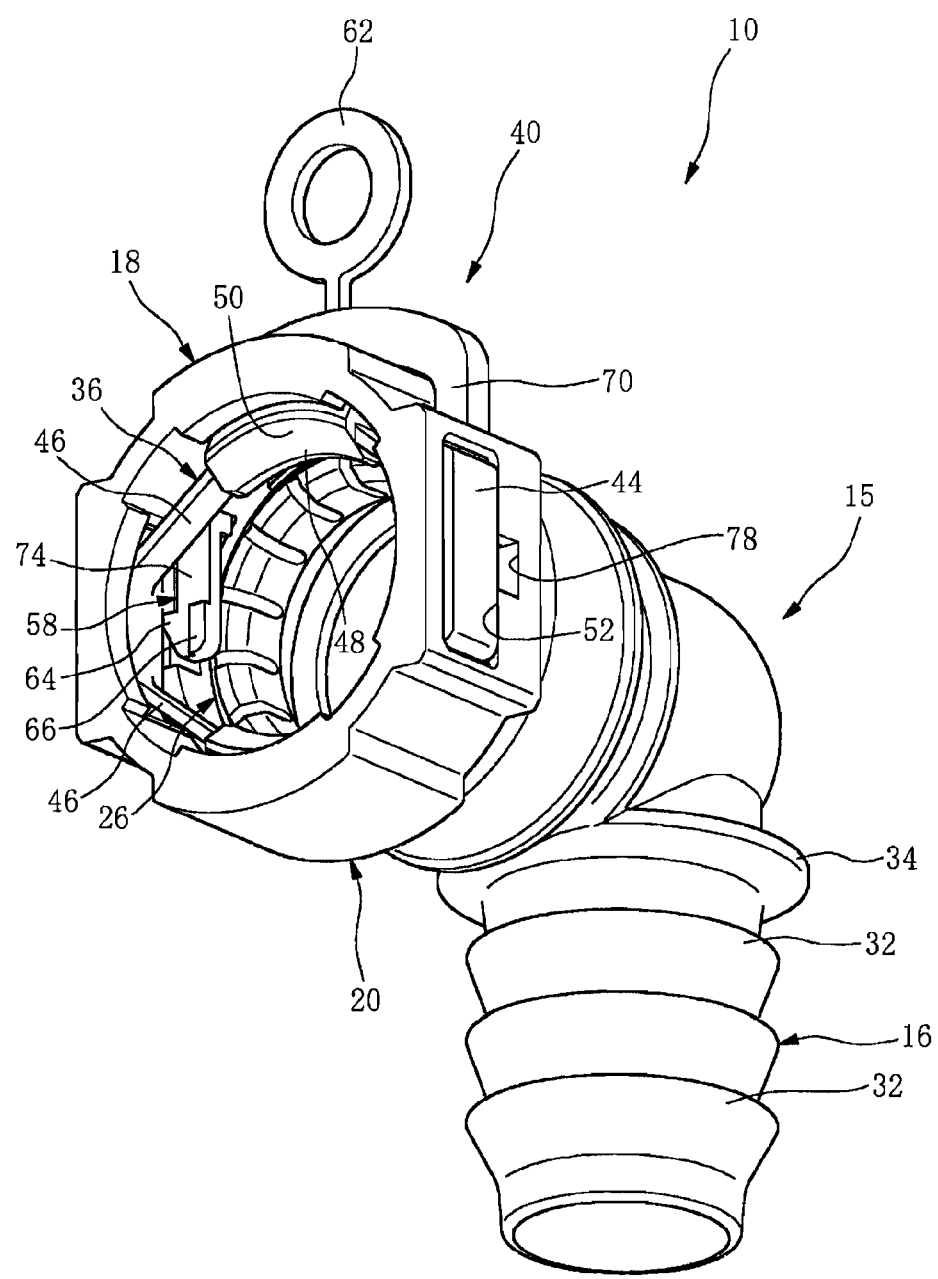
FIG. 5 is a view showing mainly an internal structure of the quick connection device of the embodiment.
Figure 6:
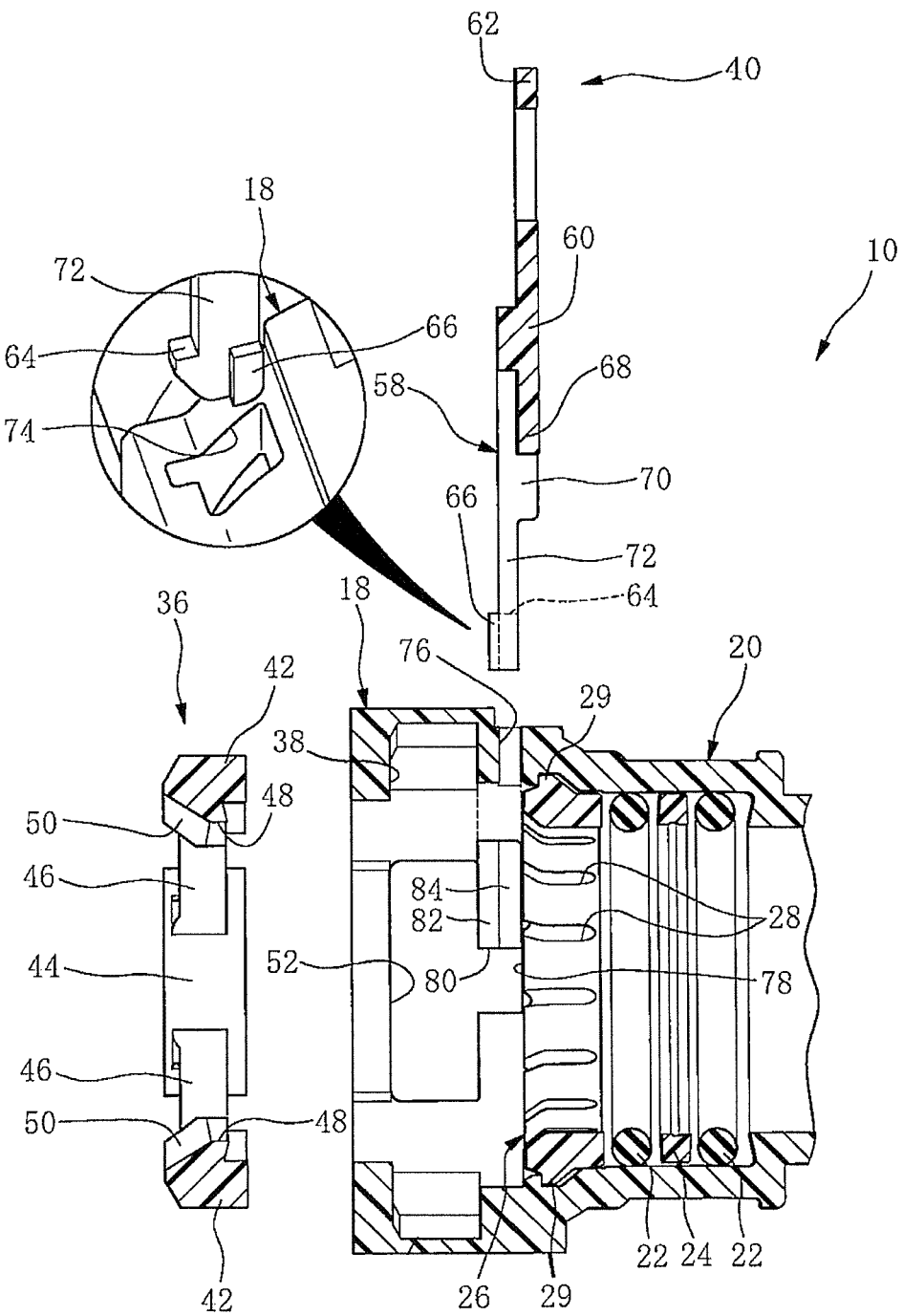
FIG. 6 is a longitudinal sectional view of a relevant part of the quick connection device of the embodiment, with the retainer and the checker removed.
Figure 7:
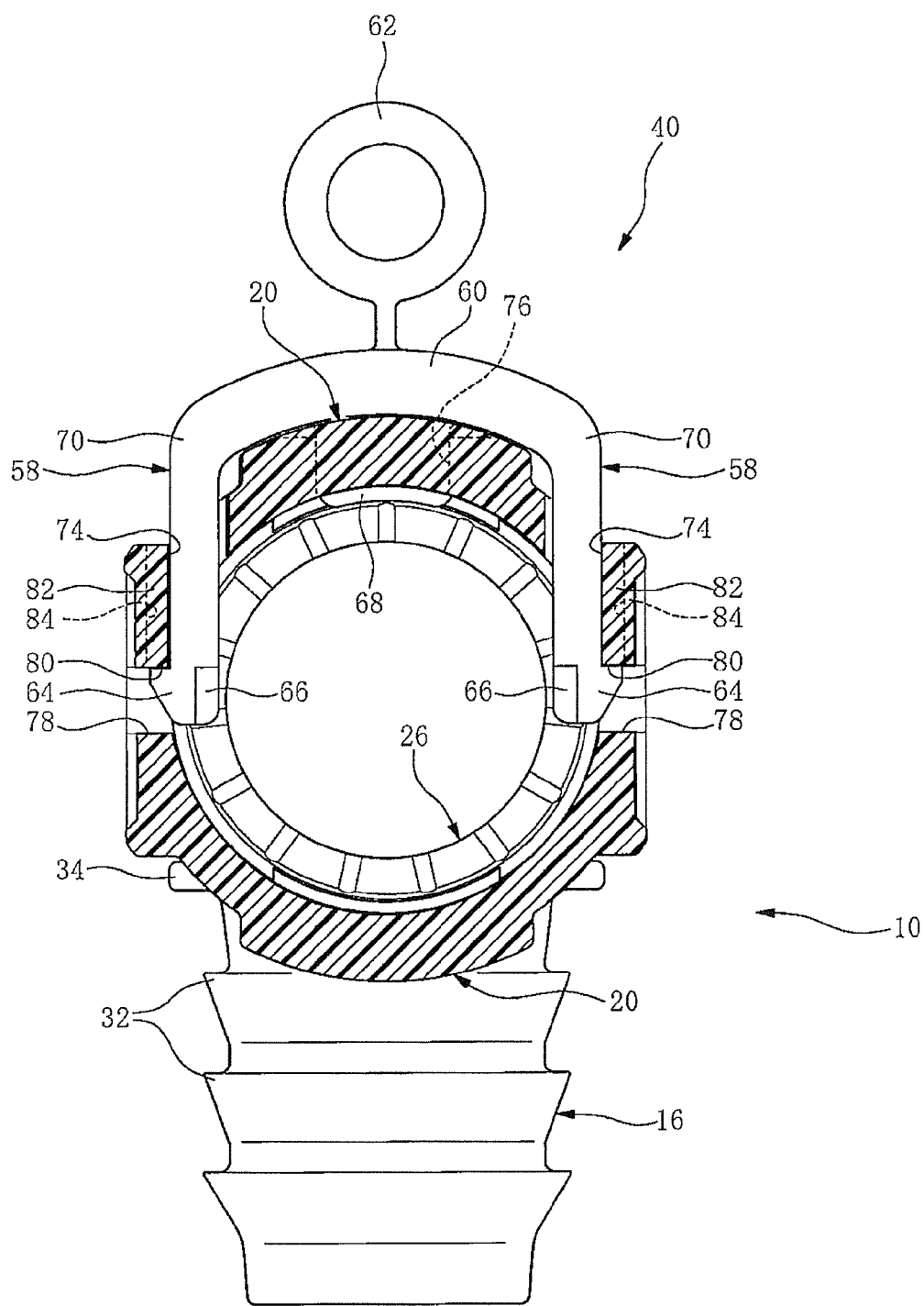
FIG. 7 is a view of the quick connection device of the embodiment, taken transversely.
Figure 8:
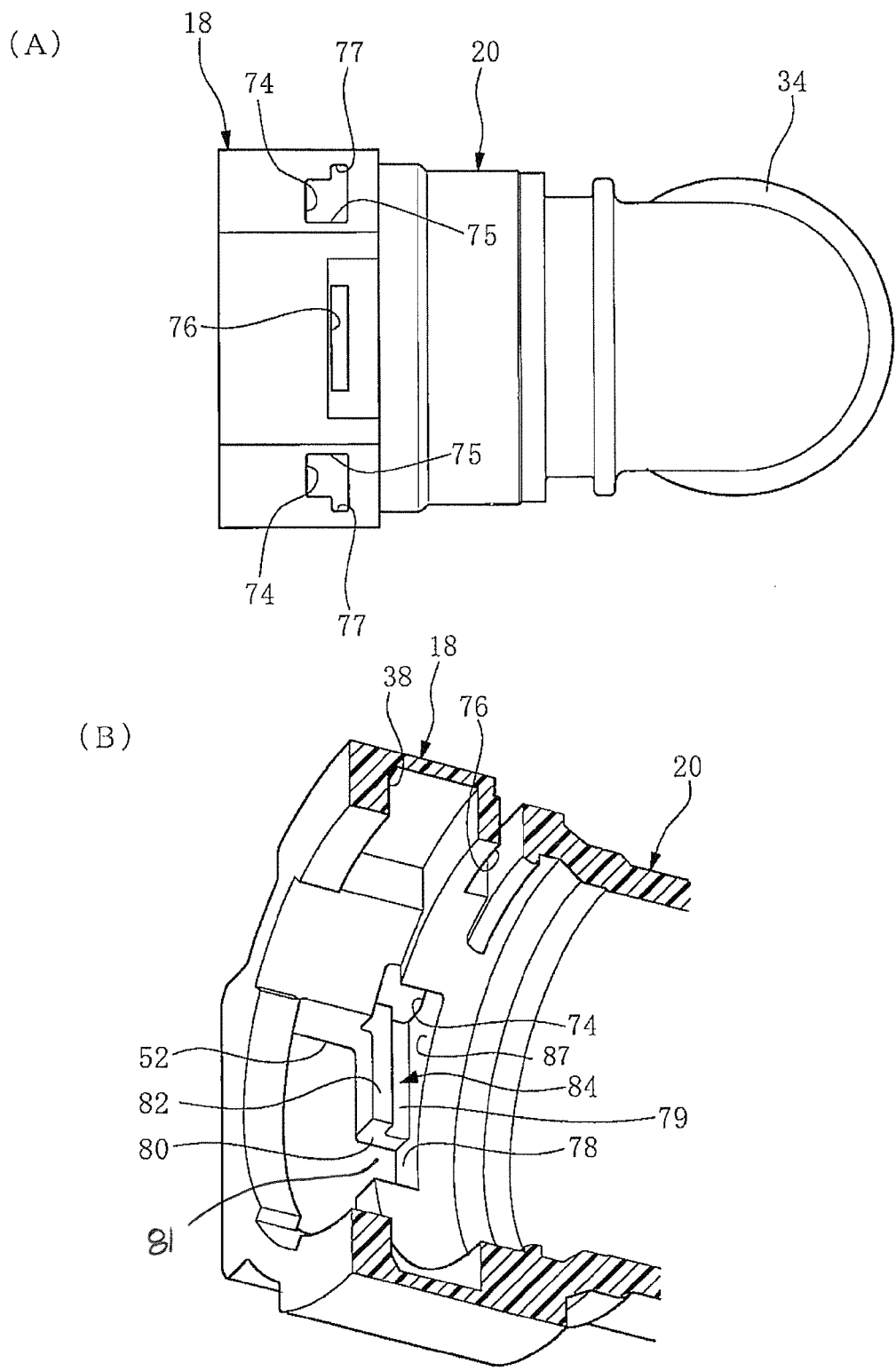
FIG. 8 is a view of a relevant part of a structure of a connector housing in the embodiment.
Figure 9:
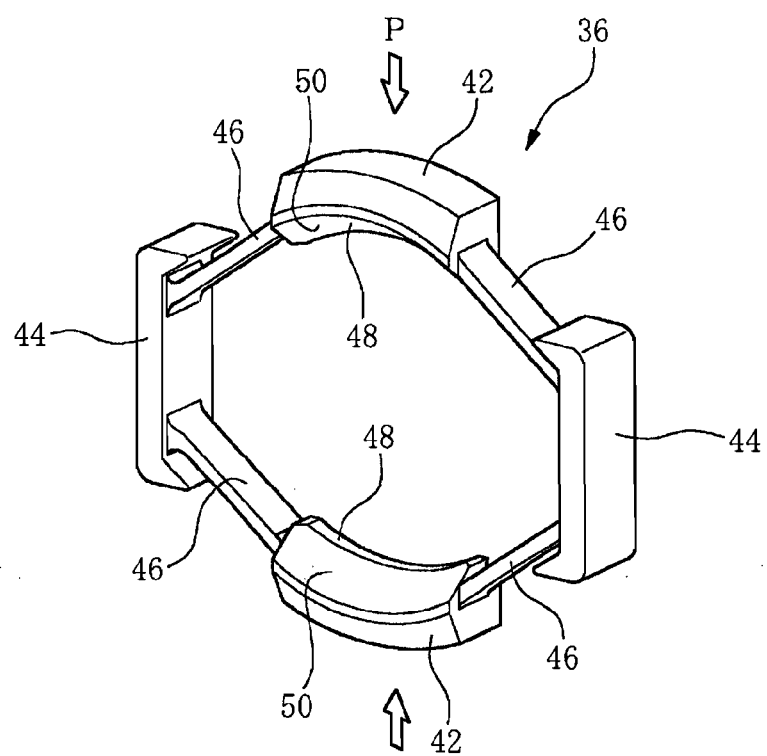
FIG. 9 is a view of the retainer alone in the embodiment.
Figure 9:
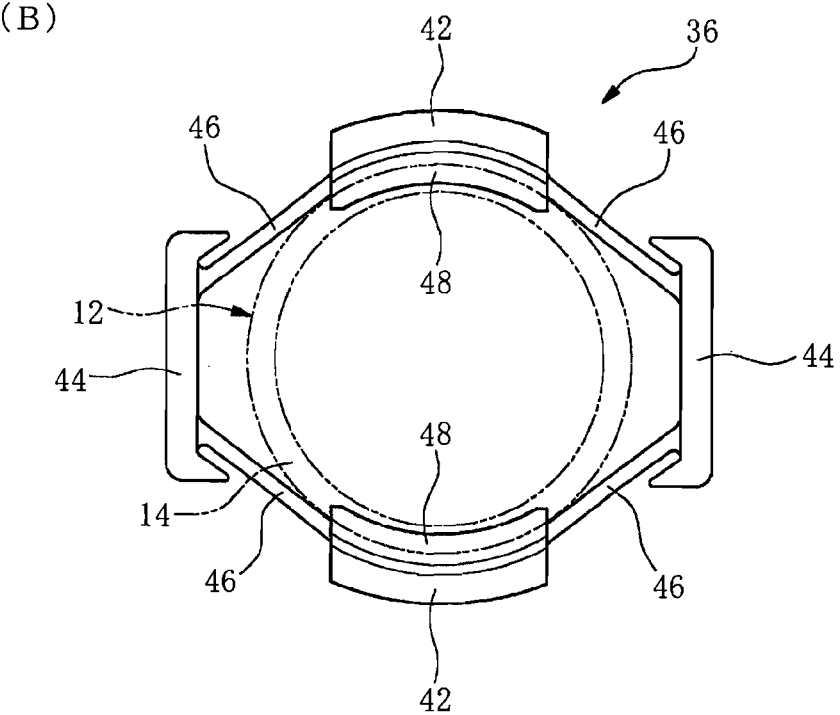
Figure 10:
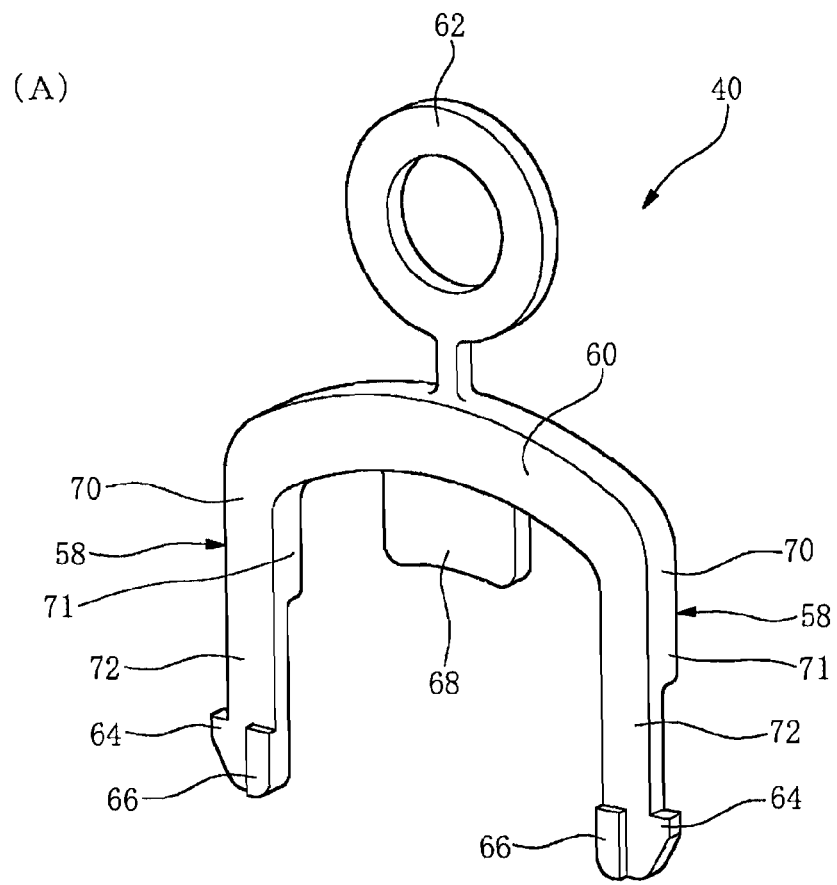
FIG. 10 is a view of the checker alone in the embodiment.
Figure 10:
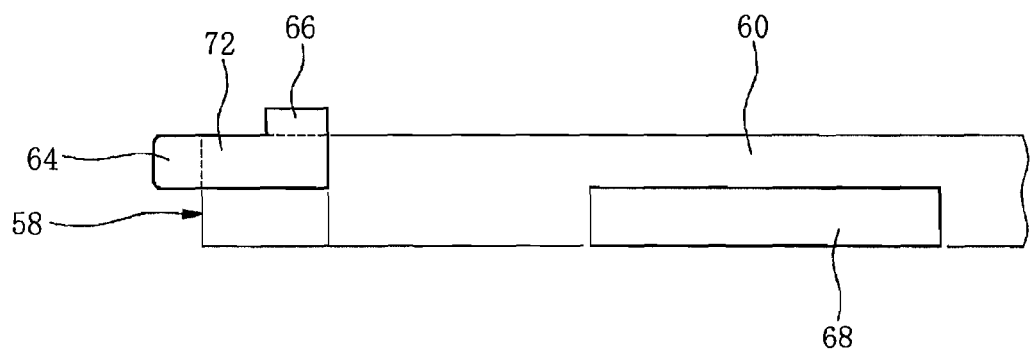
Figure 11:
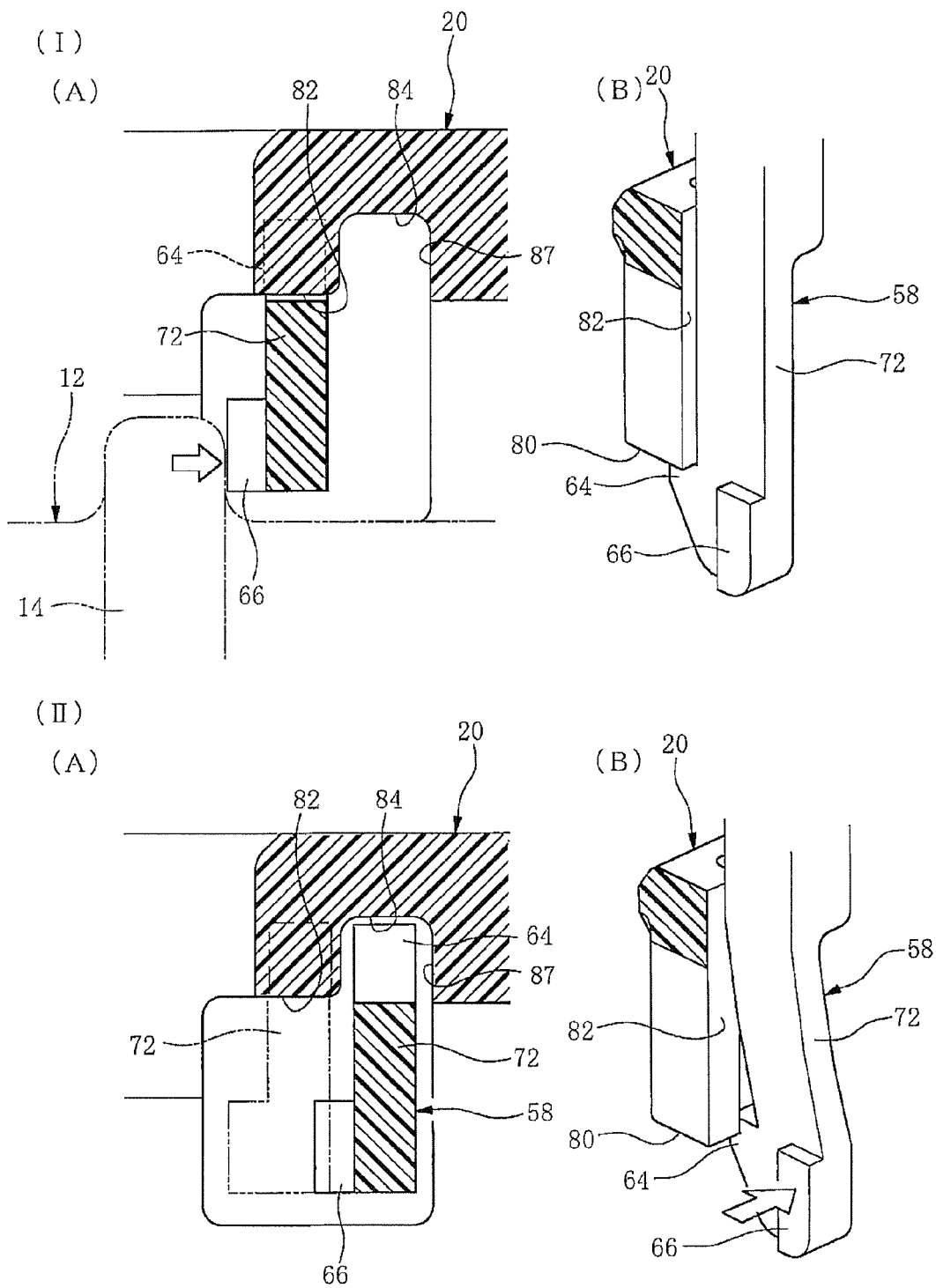
FIG. 11 is a view for explaining behavior of the checker in the embodiment.
Figure 12:
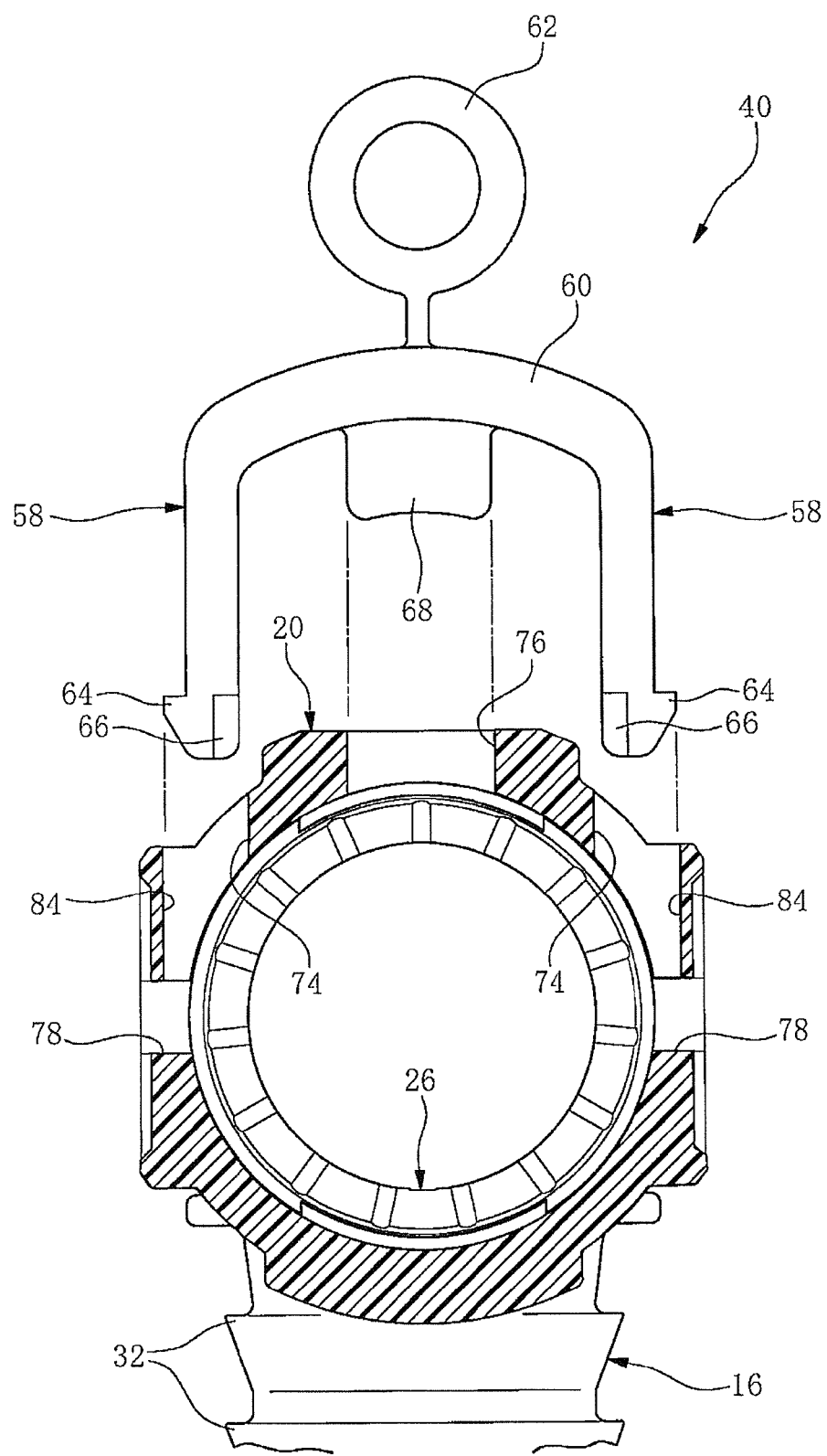
FIG. 12 is a different view from FIG. 11 for explaining behavior of the checker in the embodiment.
Figure 13:
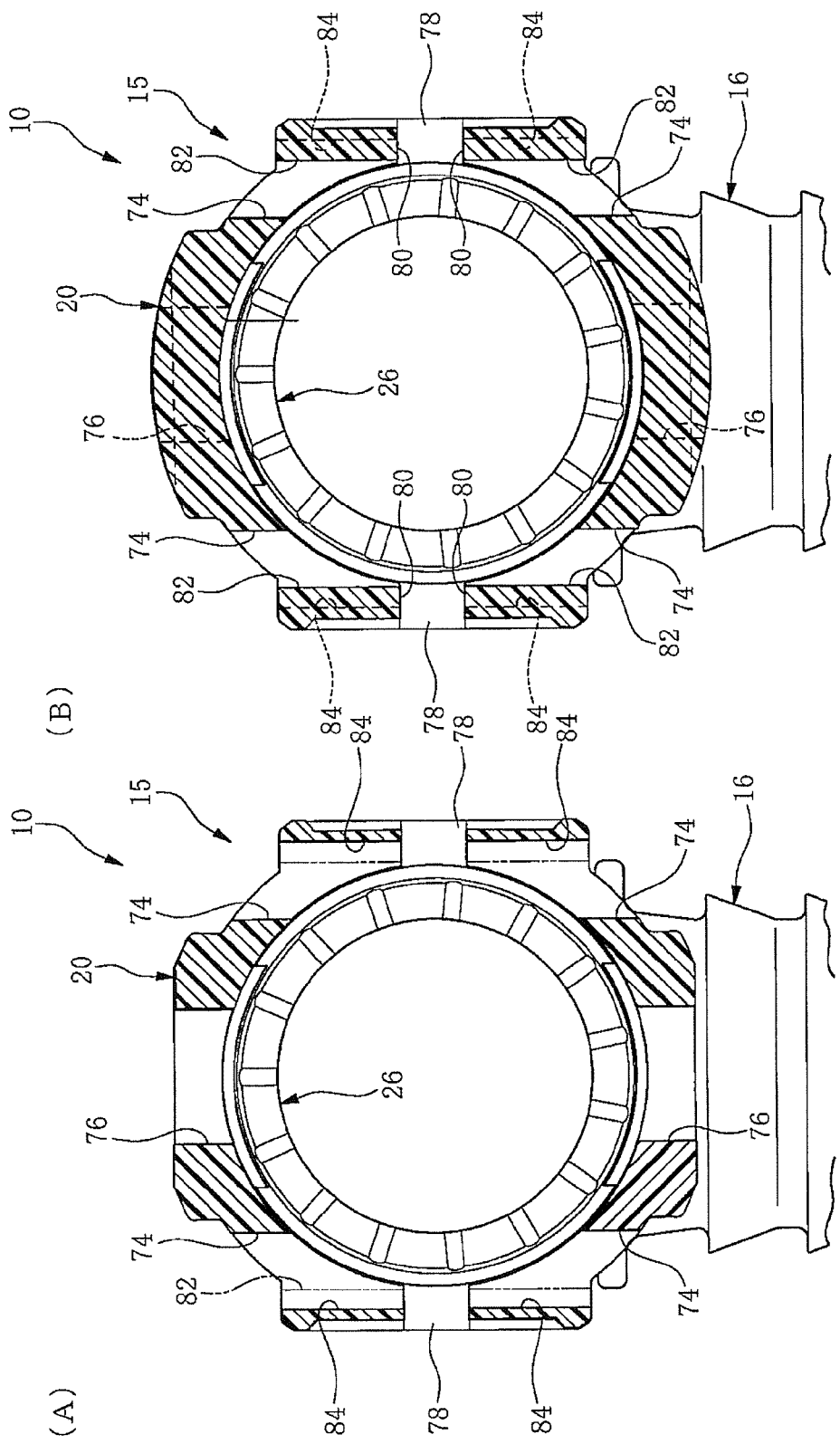
FIG. 13 is a view showing a second embodiment of the present invention.
Figure 14:
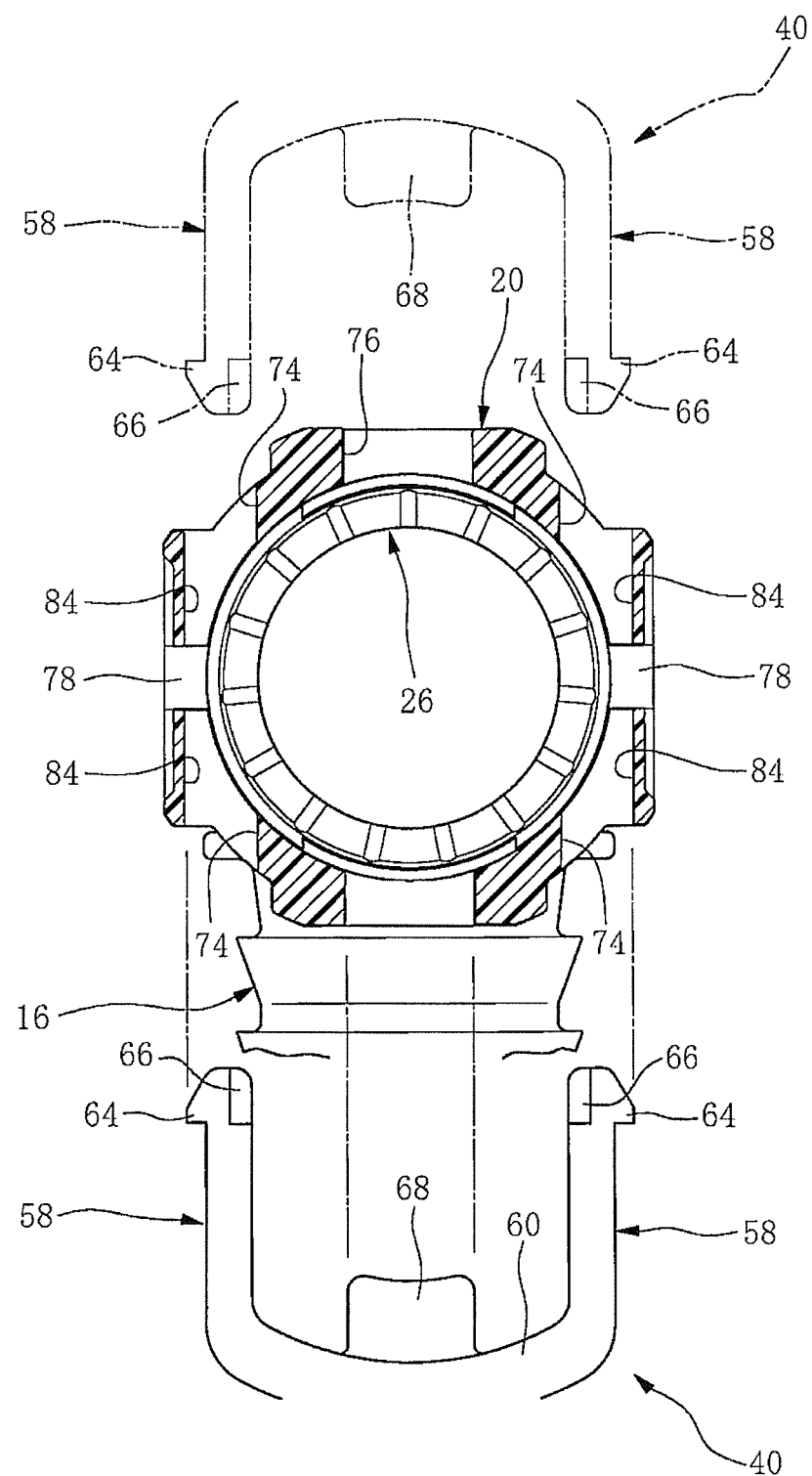
FIG. 14 is a view for explaining an example of use of the embodiment.
Figure 15:
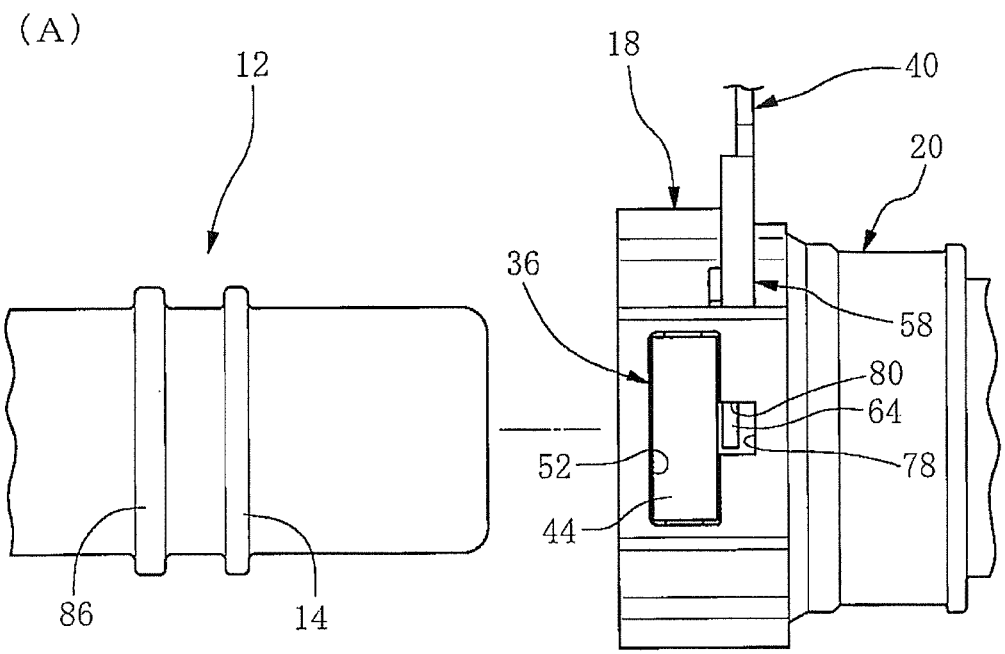
FIG. 15 is a view showing a relevant part in a third embodiment of the present invention.
Figure 15:
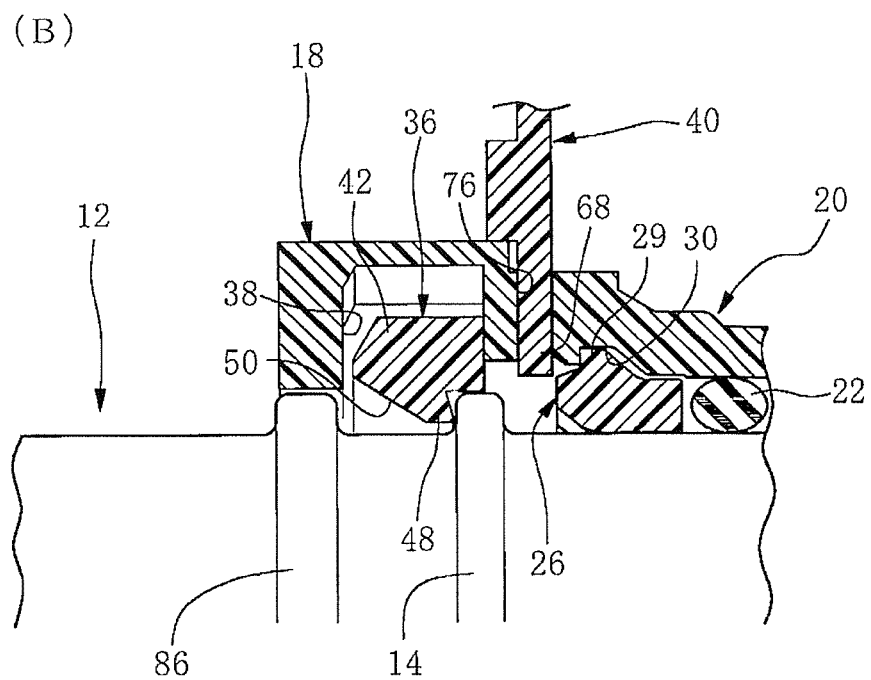
Figure 16:
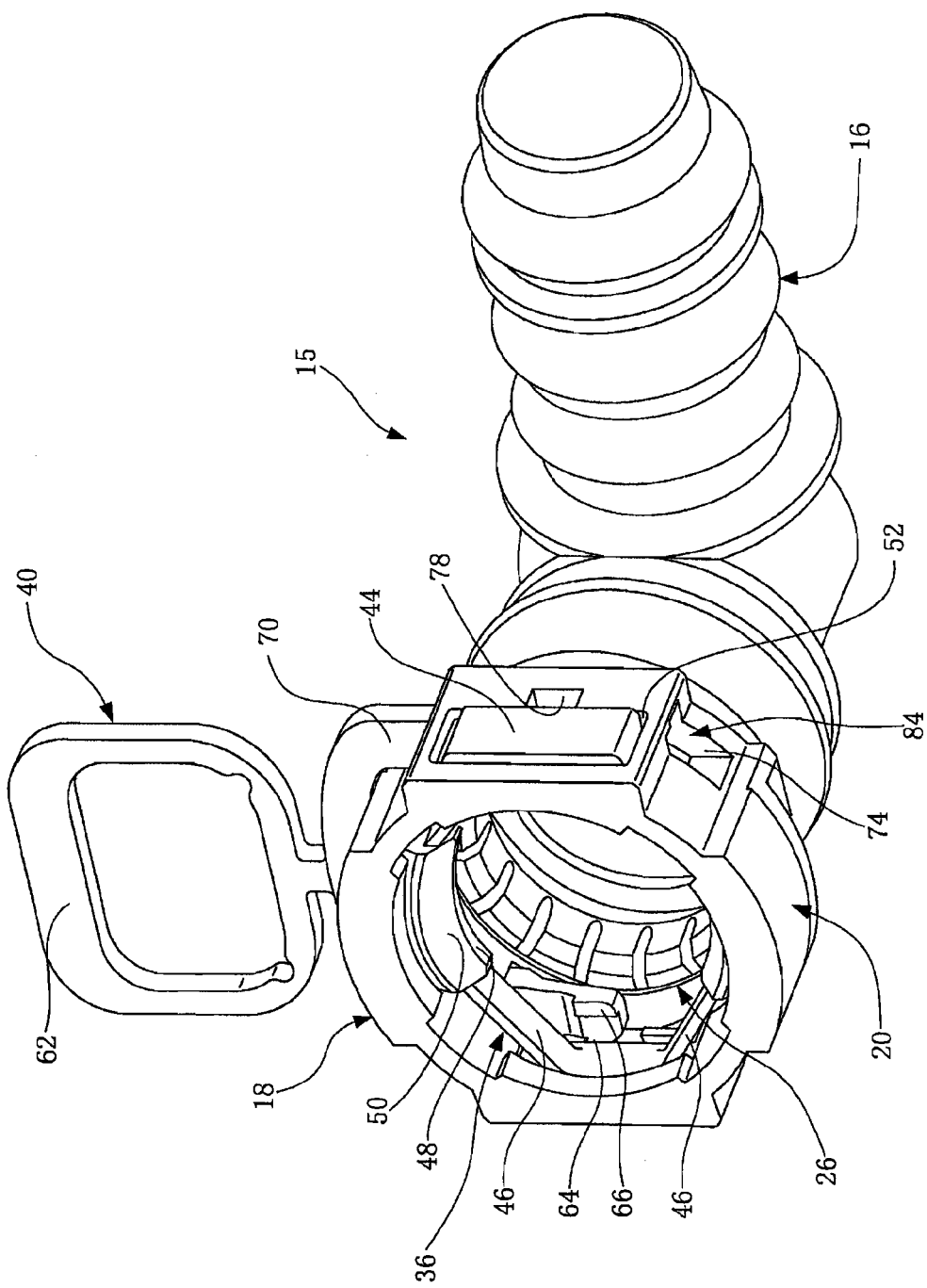
FIG. 16 is a view showing appearance of a quick connection device of a fourth embodiment of the present invention.
Figure 17:
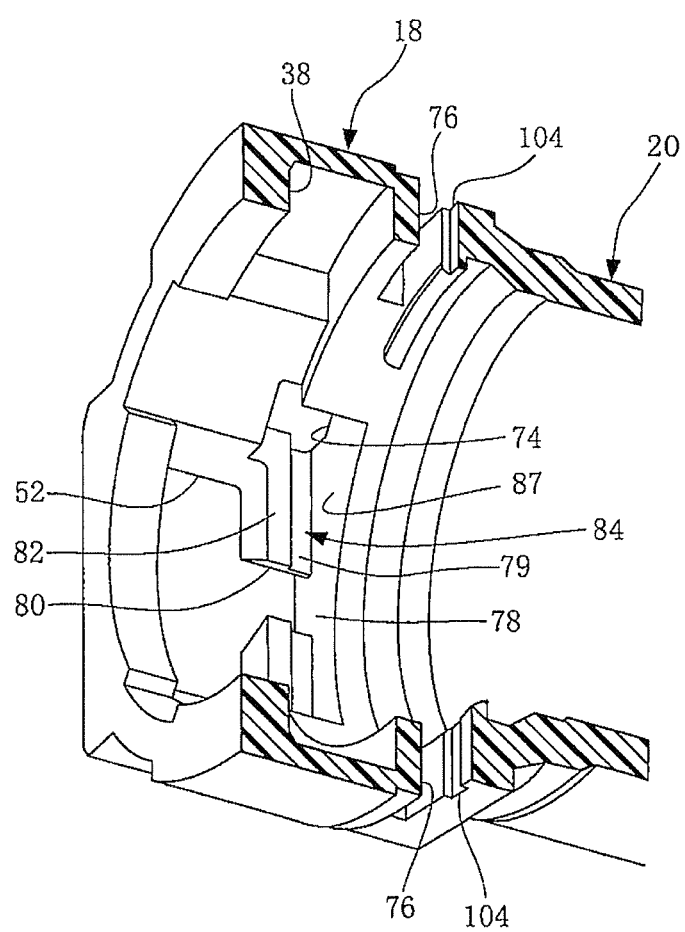
FIG. 17 is a view illustrating a relevant part of a structure of a connector housing in the embodiment.
Figure 18:
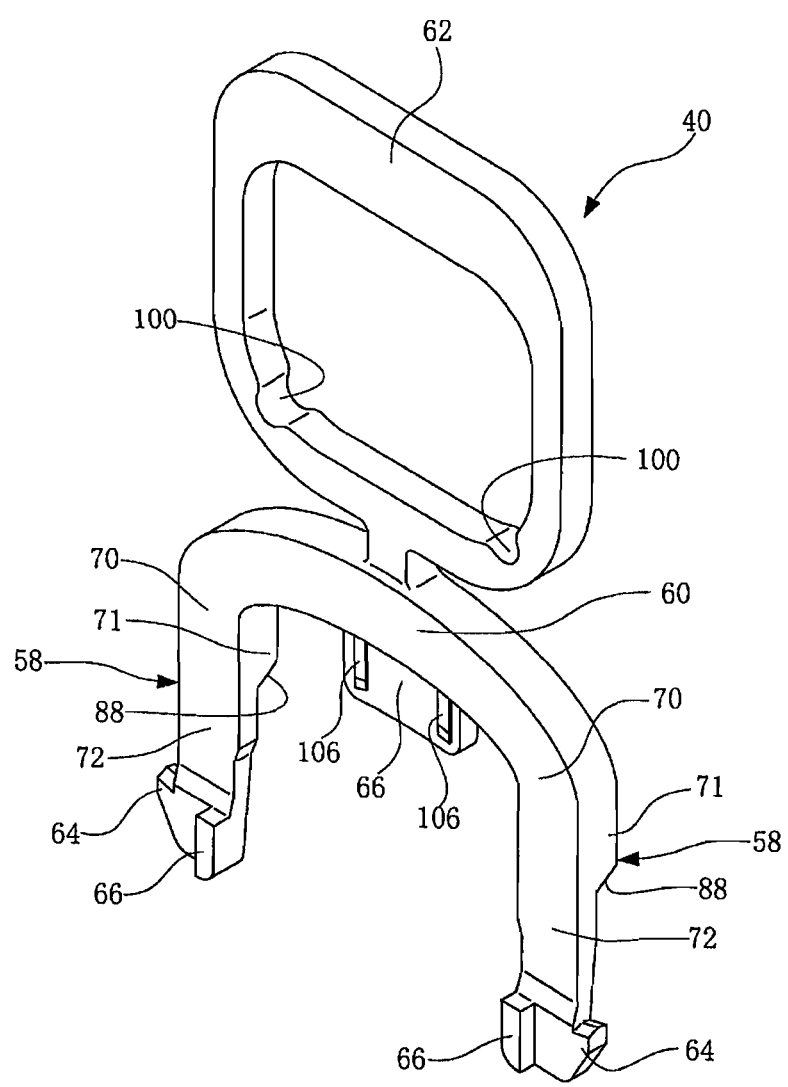
FIG. 18 is a perspective view showing a checker alone in the embodiment.
Figure 19:
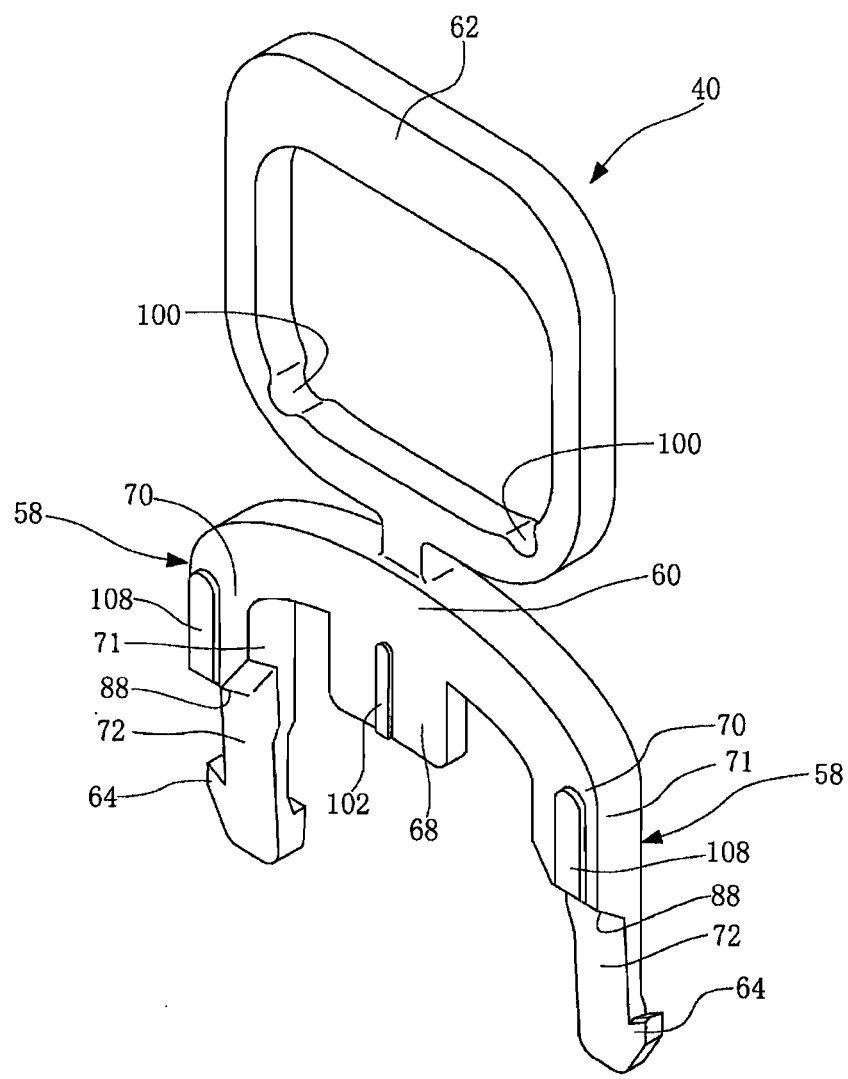
FIG. 19 is another perspective view showing the checker alone in the embodiment.
Figure 20:
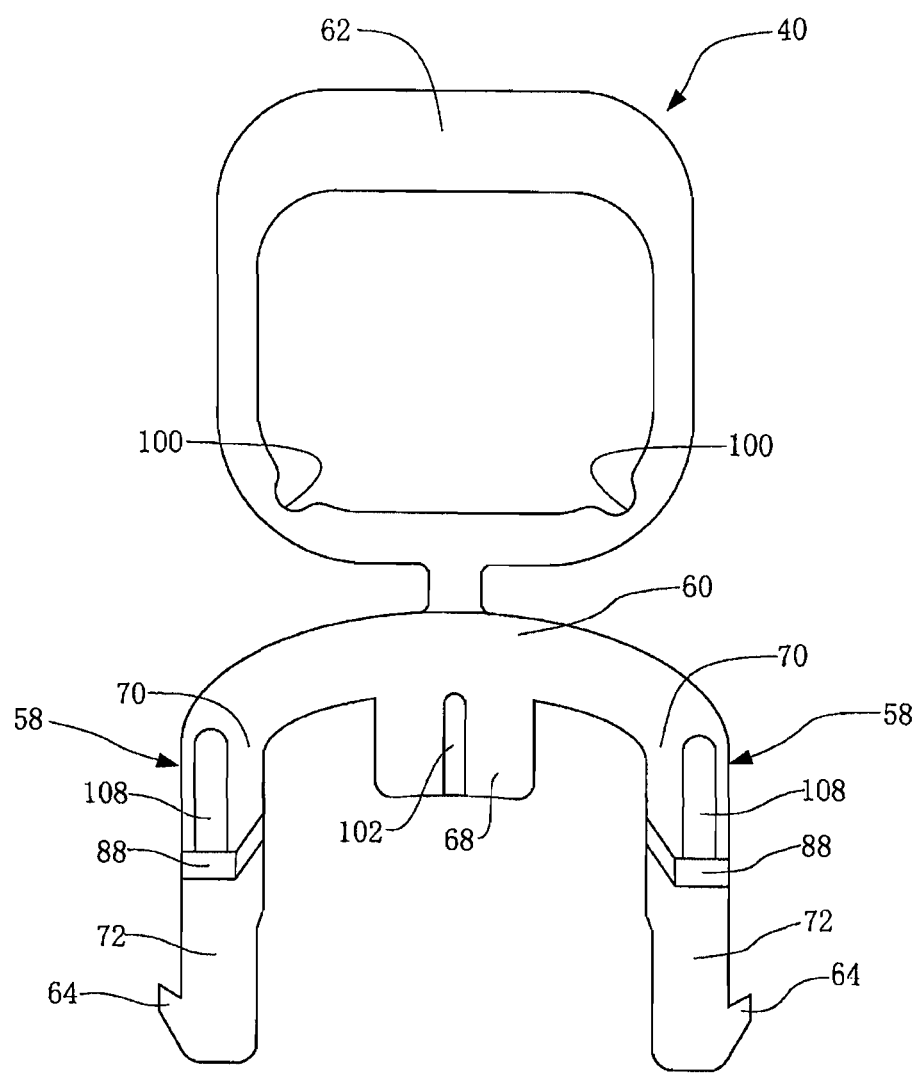
FIG. 20 is a front view of the checker alone in the embodiment.
Figure 21:
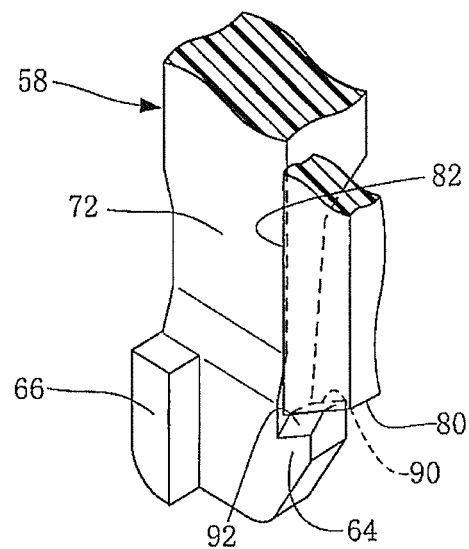
FIG. 21 is a view for explaining latching state of a latching pawl of the checker onto a latch portion in the embodiment.
Figure 21:
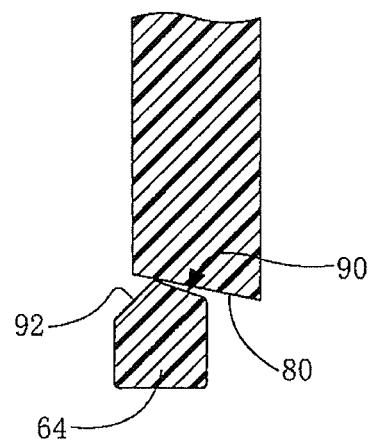
Figure 22:
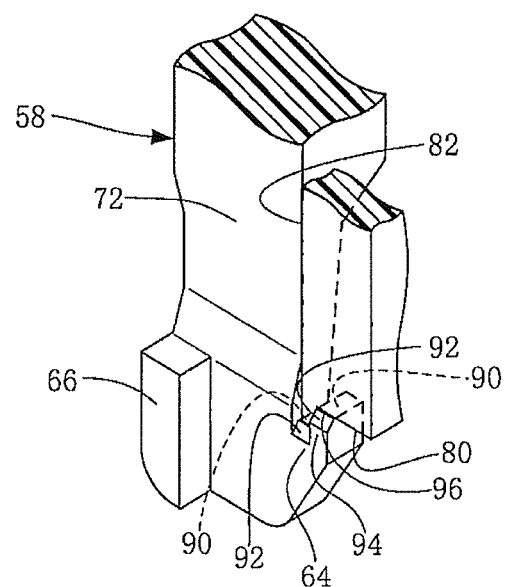
FIG. 22 is a view for explaining another latching state of the latching pawl of the checker onto the latch portion.
Figure 23:
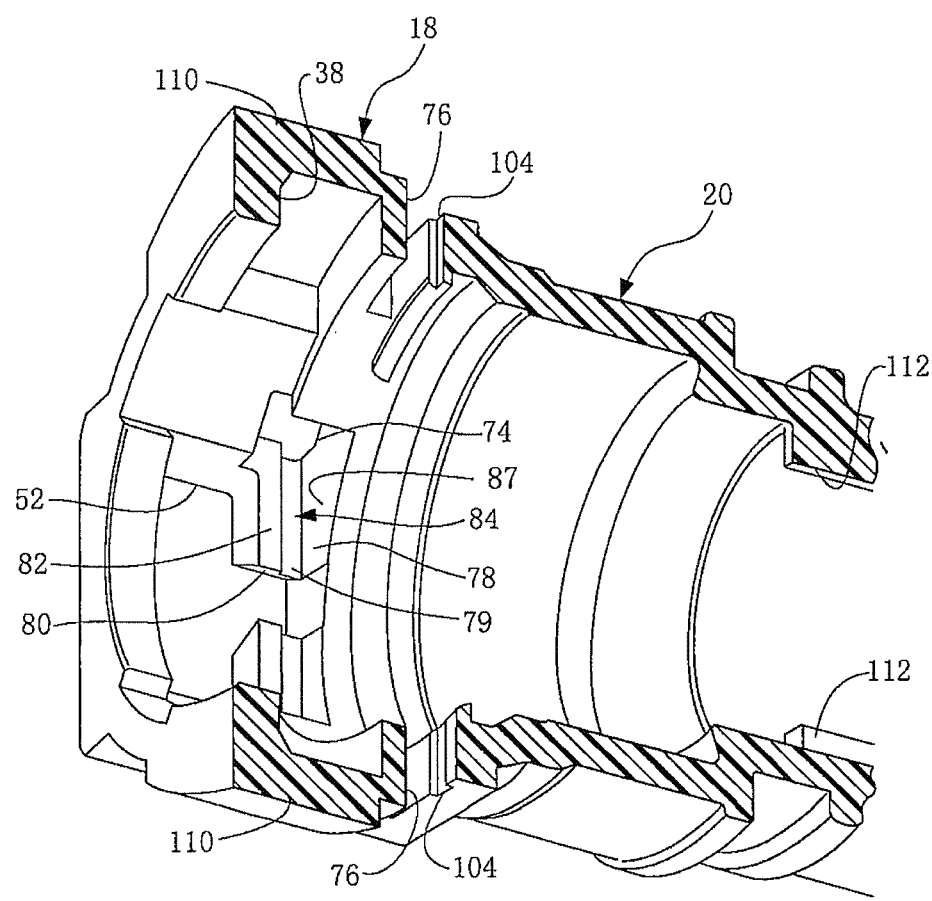
FIG. 23 is a view showing a modified example of a shape of a connector housing.
Figure 24:
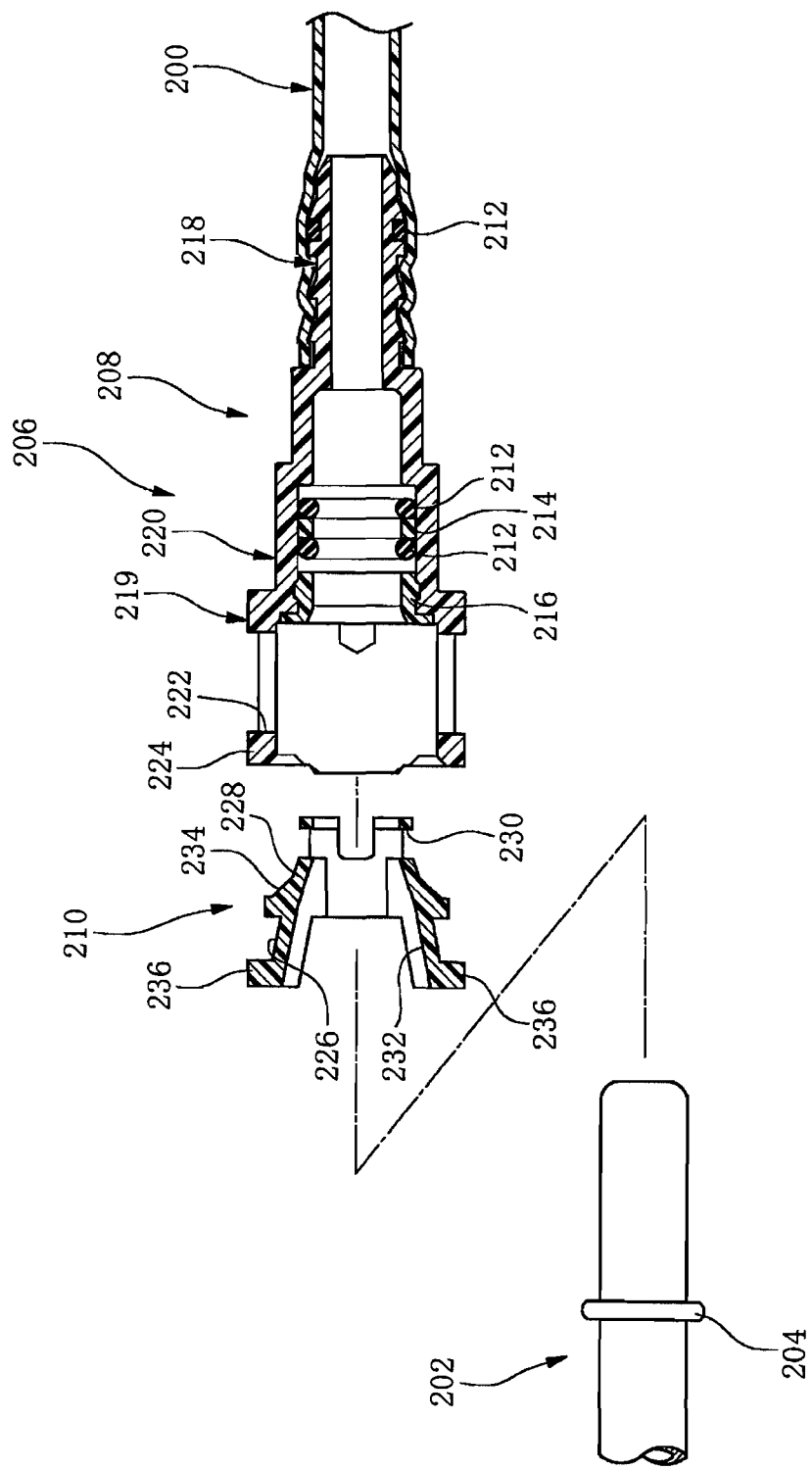
FIG. 24 is a view of one example of a conventionally known quick connector.
Figure 25:
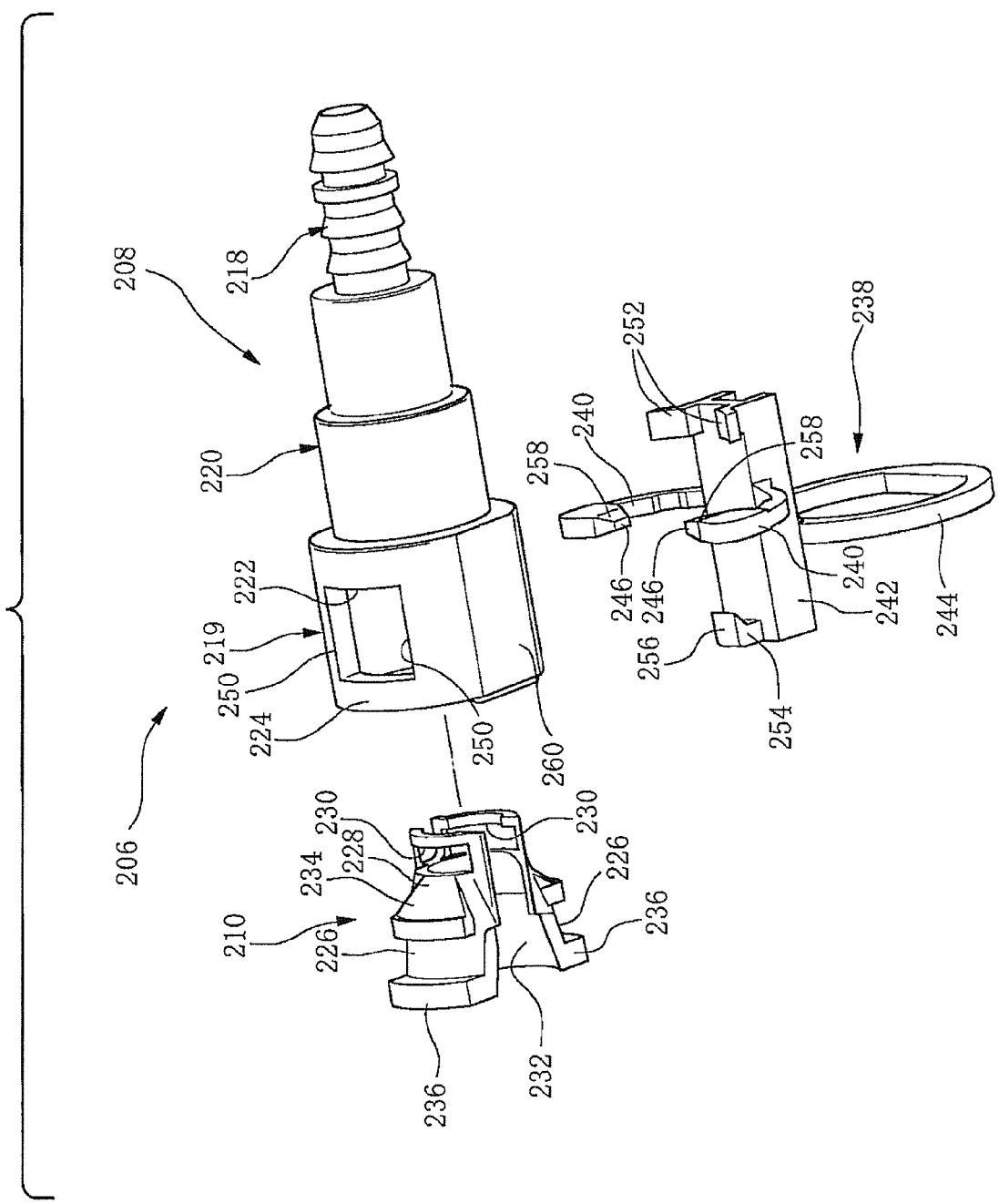
FIG. 25 is a view showing one example of a conventional quick connection device.
Figure 26:
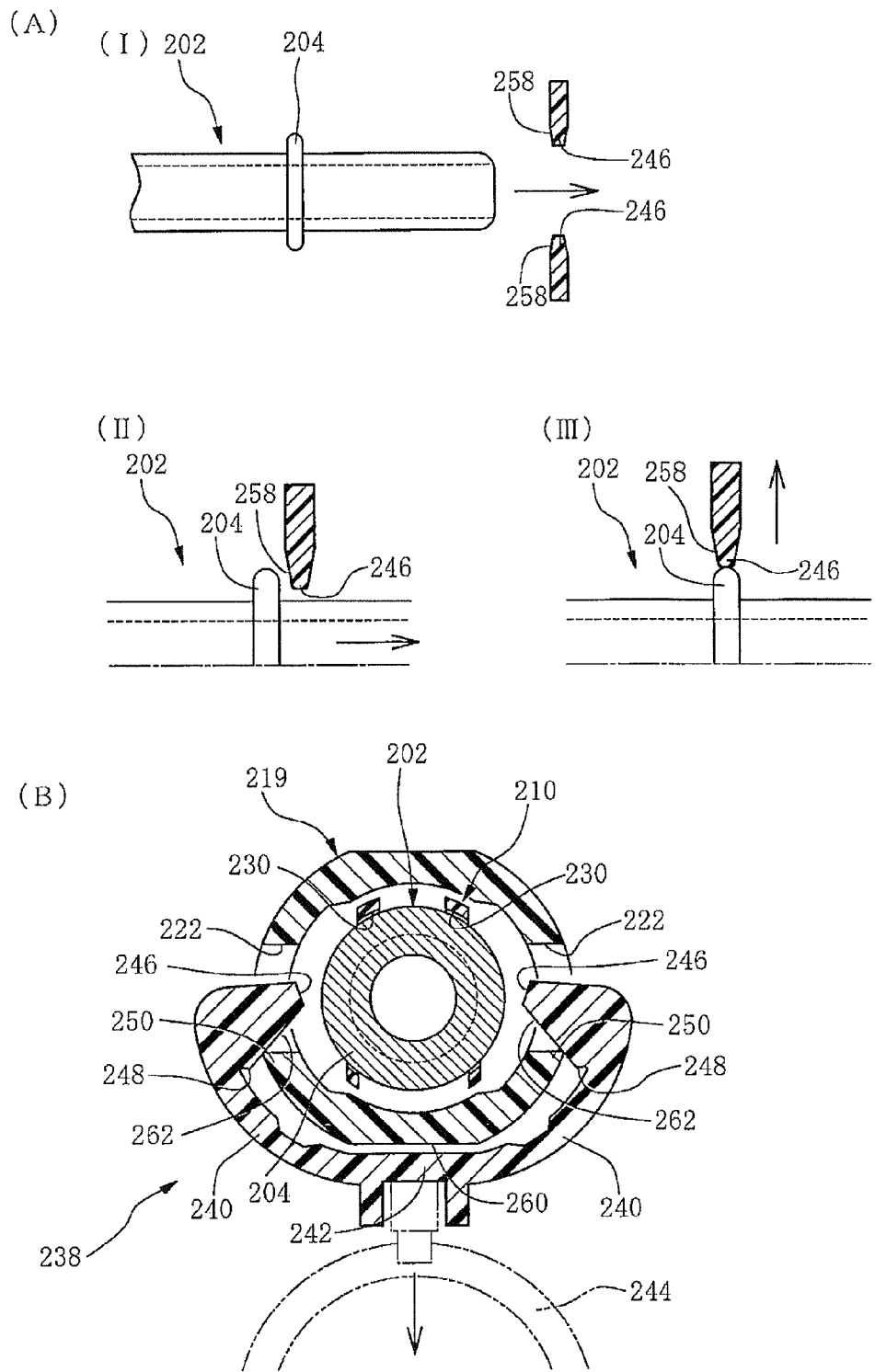
FIG. 26 is a view for explaining behavior of a checker of FIG. 25.

10 Quick connector
12 Mating pipe
14 Annular projecting portion
15 Connector body
18 Retainer holding portion
20 Connector housing
36 Retainer
40 Checker
42 Claw portion
44 Release operating portion
48 Engaging claw
74 Opening portion
58 Resilient leg
60 Base portion
64 Latching pawl
66 Releasing portion
68 Restraining portion
76 Restraining hole
80 Latch portion
82 Insertion guide
84 Guide recessed portion (withdrawal passage way)

What is claimed is:

1. A quick connector capable of being installed with a checker which is adapted for verifying complete insertion of a mating pipe in the quick connector, the quick connector, comprising:
   a tubular connector body having a connecting portion adapted to be connected to a piping tube on one axial end of the connector body and a connector housing including a retainer holding portion on the other axial end of the connector body, the connector housing being formed therethrough from one side face to an opposite side face of the retainer holding portion in a direction transverse to an axis of the connector body with retainer opening portions, resilient leg insertion opening portions between the retainer opening portions, and a restraining hole between the resilient leg insertion opening portions,
   a retainer having inwardly directed curved claw portions connected by spring bridging portions to outwardly projecting release operating portions which are configured to be held in a mating fit within the retainer opening portions, and adapted to hold a mating pipe at an insert position in locking relation by snap-engaging the claw portions of the retainer with an annular projecting portion on an outer peripheral surface of the mating pipe which is adapted to be inserted in the connector housing,
   the resilient leg insertion opening portions being formed separate from the retainer opening portions through a tubular wall of the connector housing and leading into elongated guide recessed portions adapted to receive resilient legs of the checker in the connector housing from leading ends of the resilient legs in a direction perpendicular to the axis of the connector housing,
   latch portions provided on upper edges of window portions formed behind the retainer opening portions inside the connector housing and adapted for allowing latching pawls of the resilient legs to be latched onto the latch portions, and
   a resilient deformation clearance gap defined by the window portions and the latch portions inside the connector housing and adapted for allowing the resilient legs to be resiliently deformed in an axial direction from a position of the resilient legs with the latching pawls being latched onto the latch portions to a position of the resilient legs with the latching pawls being unlatched from the latch portions,
   wherein one axial end of each of the resilient leg insertion opening portions is adapted for inserting the resilient legs through the resilient leg insertion opening portions and the one axial end of each of the resilient leg insertion opening portions is adapted to contact against a protruding portion or a thick-walled portion which protrudes in one axial direction on a middle portion or a root end of each of the resilient legs.

2. The quick connector as set forth in claim 1, wherein the latch portions inside the connector housing are inwardly directed latch portions, the connector housing is provided internally with elongated insertion guides extending from the latch portions and adapted to provide guiding movement of the latching pawls of the leading ends of the resilient legs inserted through the resilient leg insertion opening portions to a latch position with respect to the latch portions in the direction perpendicular to the axis of the connector body, and the resilient deformation clearance gap is provided at terminal ends of the insertion guides.

3. The quick connector as set forth in claim 1 or 2, wherein the restraining hole is adapted for receiving a restraining portion projecting from the checker being inserted, and the restraining hole is adapted for stabilizing a posture of the checker installed in the connector housing in cooperation with the restraining portion of the checker.

4. A checker capable of being installed in a quick connector, comprising:
   a pair of resilient legs adapted to be inserted into a connector housing through resilient leg insertion opening portions formed through a tubular wall of the connector housing, the resilient legs being connected to a base portion and extending parallel to one another along entire lengths thereof from upper or root ends of the resilient legs to lower ends of the resilient legs,
   latching pawls provided on leading end portions at the lower ends of the resilient legs and extending laterally outwardly from the leading end portions on the lower ends of the resilient legs, the latching pawls being adapted to latch onto latch portions of the connector housing, and
   a releasing portion protruding from front surfaces of the lower ends of the resilient legs and adapted for unlatching the latching pawls from the latch portions and allowing the resilient legs to be removed from the connector housing due to abutment with an annular projecting portion of a mating pipe, and
   wherein each of the resilient legs is provided with a protruding portion or a thick-walled portion on the upper or the root end of the resilient leg which protrudes in one axial direction opposite the releasing portion, the protruding portion or the thick-walled portion being adapted to be received in one of the resilient leg insertion opening portions while being pressed into engagement against one axial end of the resilient leg insertion opening portion when the resilient legs are inserted through the resilient leg insertion opening portions.

5. The checker as set forth in claim 4, wherein the releasing portion is formed on each of the leading cud portions of the resilient legs, and is adapted so as to protrude in an axial direction of the connector housing toward the annular projecting portion of the mating pipe.

6. The checker as set forth in claim 4 or 5, wherein the base portion connects the upper or root ends of the pair of the resilient leas to each other, and includes a restraining portion projecting downward from the base portion between the resilient legs.

7. The checker as set forth in claim 4, wherein the resilient legs are guided in the connector housing such that the latching pawls are adapted to be received in guide recesses formed in the connector housing,
   the protruding portions or thick-walled portions are adapted to be received in the resilient leg insertion opening portions so as to curve the resilient legs in arch shapes while the latching pawls are fitted in the guide recesses, and
   the arch shaped resilient legs spring back so as to snappingly move the latching pawls in the other axial direction when the arch shaped resilient legs are inserted in the connector housing until the latching pawls pass through the guide recesses.

8. A quick connector equipped with a checker comprising a quick connector and a checker installed in the quick connection, the quick connector, comprising:
   a tubular connector body having a connecting portion adapted to be connected to a piping tube on one axial end of the connector body and a connector housing including a retainer holding portion on the other axial end of the connector body, the connector housing being formed therethrough from one side face to an opposite side face of the retainer holding portion in a direction transverse to an axis of the connector body with retainer opening portions, and a restraining hole between the retainer opening portions, a retainer having inwardly directed curved claw portions connected by spring bridging portions to outwardly projecting release operating portions which are configured to be held in a mating fit within the retainer opening portions, and adapted for snap-engaging with an annular projecting portion of a mating pipe which is adapted to be inserted in the connector housing, the checker, comprising:

a pair of resilient legs extending parallel to one another along entire lengths from upper or root ends to lower ends and latching pawls extending laterally outwardly on leading end portions on the lower ends of the pair of the resilient legs, respectively, the quick connector, further comprising:

resilient leg insertion opening portions formed in the connector housing separate from the retainer opening portions for receiving the resilient legs of the checker into the connector housing from the leading end portions of the resilient legs, latch portions provided inside the connector housing for latching the latching pawls of the resilient legs onto the latch portions to prevent the latching pawls from being removed in a removing direction of the resilient legs when the resilient legs are inserted into the connector housing through the resilient leg insertion opening portions, wherein the latch portions are formed so as to allow the latching pawls latched onto the latch portions to be moved in one axial direction and to be unlatched from the latch portions when the latching pawls are pushed in the other axial direction, wherein the connector housing is formed so as to allow the resilient legs to be withdrawn through the resilient leg insertion opening portions when the resilient legs are deformed or displaced in the other axial direction until the latching pawls are unlatched from the latch portions, and wherein each of the resilient legs is provided with a protruding portion or a thick-walled portion on the upper or root end of the resilient leg which protrudes in one axial direction, the protruding portion or thick-walled portion being received in the resilient leg insertion opening portion while being pressed into engagement against one axial end of the resilient leg insertion opening portion when the resilient legs are inserted through the resilient leg insertion opening portions.

9. The quick connector equipped with the checker as set forth in claim 8, wherein the connector housing is provided with guide recesses for receiving slide portions of the resilient legs that are inserted through the resilient leg insertion opening portions in the connector housing and guiding the resilient legs inwardly in the connector housing, and wherein the latch portions are provided on the other axial end with respect to the guide recesses inside the connector housing, and are provided to allow the latching pawls of the resilient legs inserted in the connector housing along the guide recesses to be moved in the other axial direction and to be latched onto the latch portions by installing means between the checker and the connector housing.

10. A checker capable of being installed in a quick connector having a connector housing, the checker being adapted for verifying complete insertion of a mating pipe in the connector housing, the checker, comprising:

a pair of resilient legs adapted to be inserted through resilient leg insertion opening portions formed in the connector housing from leading end portions of the resilient legs, the resilient legs extending parallel to one another along entire lengths thereof from upper or root ends of the resilient legs to lower ends of the resilient legs having the leading end portions, latching pawls formed on and extending laterally outwardly from the leading end portions at the lower ends of the pair of the resilient legs, the latching pawls being adapted to be latched onto latch portions provided inside the connector housing and adapted to be prevented from being removed in a removing direction of the resilient legs when the resilient legs are inserted in the connector housing through the resilient leg insertions opening portions, wherein the latching pawls are adapted to be moved in one axial direction by being pushed until unlatched from the latch portions, and wherein the resilient legs are provided with protruding portions or thick-walled portions on the upper or root ends of the resilient legs which protrude in the one axial direction, the protruding portion or the thick-walled portion being adapted to be received in one of the resilient leg insertion opening portions while being pressed into engagement against one axial end of the resilient leg insertion opening portion when the resilient legs are inserted through the resilient leg insertion opening portions;

wherein the checker has a base portion which connects the upper or root ends of the pair of the resilient legs to each other, and a restraining portion projecting downward from the base portion in an extending direction of the resilient legs.

* * * * *